(12) United States Patent
Soni

(10) Patent No.: US 11,376,529 B2
(45) Date of Patent: Jul. 5, 2022

(54) PARTICLE FILTER SYSTEM

(71) Applicant: IP 33 LTD, Oadby (GB)

(72) Inventor: Piush Soni, Oadby (GB)

(73) Assignee: IP 33 LTD, Leicestershire (GB)

(*) Notice: Subject to any disclaimer, the term of this patent is extended or adjusted under 35 U.S.C. 154(b) by 0 days.

(21) Appl. No.: 17/384,559

(22) Filed: Jul. 23, 2021

(65) Prior Publication Data

US 2021/0346825 A1    Nov. 11, 2021

Related U.S. Application Data

(63) Continuation-in-part of application No. 17/306,916, filed on May 3, 2021, which is a continuation-in-part of application No. 17/099,721, filed on Nov. 16, 2020, which is a continuation-in-part of application No. 16/735,615, filed on Jan. 6, 2020, now Pat. No. 10,994,229, and a continuation-in-part of application No. 16/735,629, filed on Jan. 6, 2020, now abandoned.

(60) Provisional application No. 62/948,784, filed on Dec. 16, 2019, provisional application No. 62/936,111, filed on Nov. 15, 2019.

(51) Int. Cl.

| | |
|---|---|
| *B01D 29/58* | (2006.01) |
| *B01D 29/03* | (2006.01) |
| *B01D 29/21* | (2006.01) |
| *B01D 39/16* | (2006.01) |
| *B01D 39/20* | (2006.01) |
| *C02F 1/00* | (2006.01) |
| *C02F 1/28* | (2006.01) |
| *C02F 1/42* | (2006.01) |

(52) U.S. Cl.
CPC ............. *B01D 29/58* (2013.01); *B01D 29/03* (2013.01); *B01D 29/21* (2013.01); *B01D 39/163* (2013.01); *B01D 39/2048* (2013.01); *C02F 1/002* (2013.01); *B01D 2239/065* (2013.01); *B01D 2239/0622* (2013.01); *C02F 1/283* (2013.01); *C02F 2201/003* (2013.01)

(58) Field of Classification Search
None
See application file for complete search history.

(56) References Cited

U.S. PATENT DOCUMENTS

| | | |
|---|---|---|
| 4,828,698 A | 5/1989 | Jewell et al. |
| 5,017,286 A | 5/1991 | Heiligman |
| 5,259,954 A | 11/1993 | Taylor |

(Continued)

FOREIGN PATENT DOCUMENTS

| | | |
|---|---|---|
| JP | 10113507 A | 5/1998 |
| WO | 2006031838 A1 | 3/2006 |

OTHER PUBLICATIONS

Rowzee, M., et al., "A Filter for All Occasions", Reeves Journal 2.0 85.7: pp. 102-103 (Jul. 2005).

*Primary Examiner* — Clare M Perrin
(74) *Attorney, Agent, or Firm* — Kevin McNeely; McNeely, Hare & War, LLP

(57) ABSTRACT

A particle filtration system that includes first, second and third filter segments that each include several first, second and third filters. Each first, second and third filter includes a fibrous layer sandwiched between a pair of surface or outer layers. The range of pore sizes of each first, second and third filter varies according to the density of the surface layers relative to the fibrous layers.

17 Claims, 41 Drawing Sheets

(56) References Cited

U.S. PATENT DOCUMENTS

| | | |
|---|---|---|
| 5,266,196 A | 11/1993 | Fife et al. |
| 5,824,232 A | 10/1998 | Asher et al. |
| 5,968,373 A * | 10/1999 | Choi ..................... B01D 39/06 |
| | | 210/489 |
| 6,171,684 B1 * | 1/2001 | Kahlbaugh ............ B01D 27/06 |
| | | 428/212 |
| 6,325,929 B1 | 12/2001 | Bassett |
| 6,464,870 B1 | 10/2002 | Castellanos et al. |
| 7,081,201 B2 | 7/2006 | Bassett et al. |
| 7,390,343 B2 | 6/2008 | Tepper et al. |
| 7,601,262 B1 | 10/2009 | Tepper et al. |
| 7,618,480 B2 | 11/2009 | Barnwell |
| 7,862,720 B2 | 1/2011 | Brown |
| 8,701,895 B2 | 4/2014 | Levy |
| 9,162,167 B2 | 10/2015 | Brown |
| 9,309,131 B2 | 4/2016 | Kaledin et al. |
| 9,707,538 B2 | 7/2017 | Kaledin et al. |
| 2004/0055939 A1 | 3/2004 | Wybo |
| 2004/0206682 A1 | 10/2004 | Hamlin |
| 2004/0211160 A1 * | 10/2004 | Rammig ................ B01D 46/12 |
| | | 55/382 |
| 2005/0035041 A1 | 2/2005 | Nohren et al. |
| 2009/0308811 A1 | 12/2009 | Tepper et al. |
| 2011/0210061 A1 * | 9/2011 | Li ...................... B01D 39/1623 |
| | | 210/491 |
| 2015/0053602 A1 | 2/2015 | Pritchard |
| 2021/0354059 A1 * | 11/2021 | Goertz ................... B01D 25/26 |

* cited by examiner

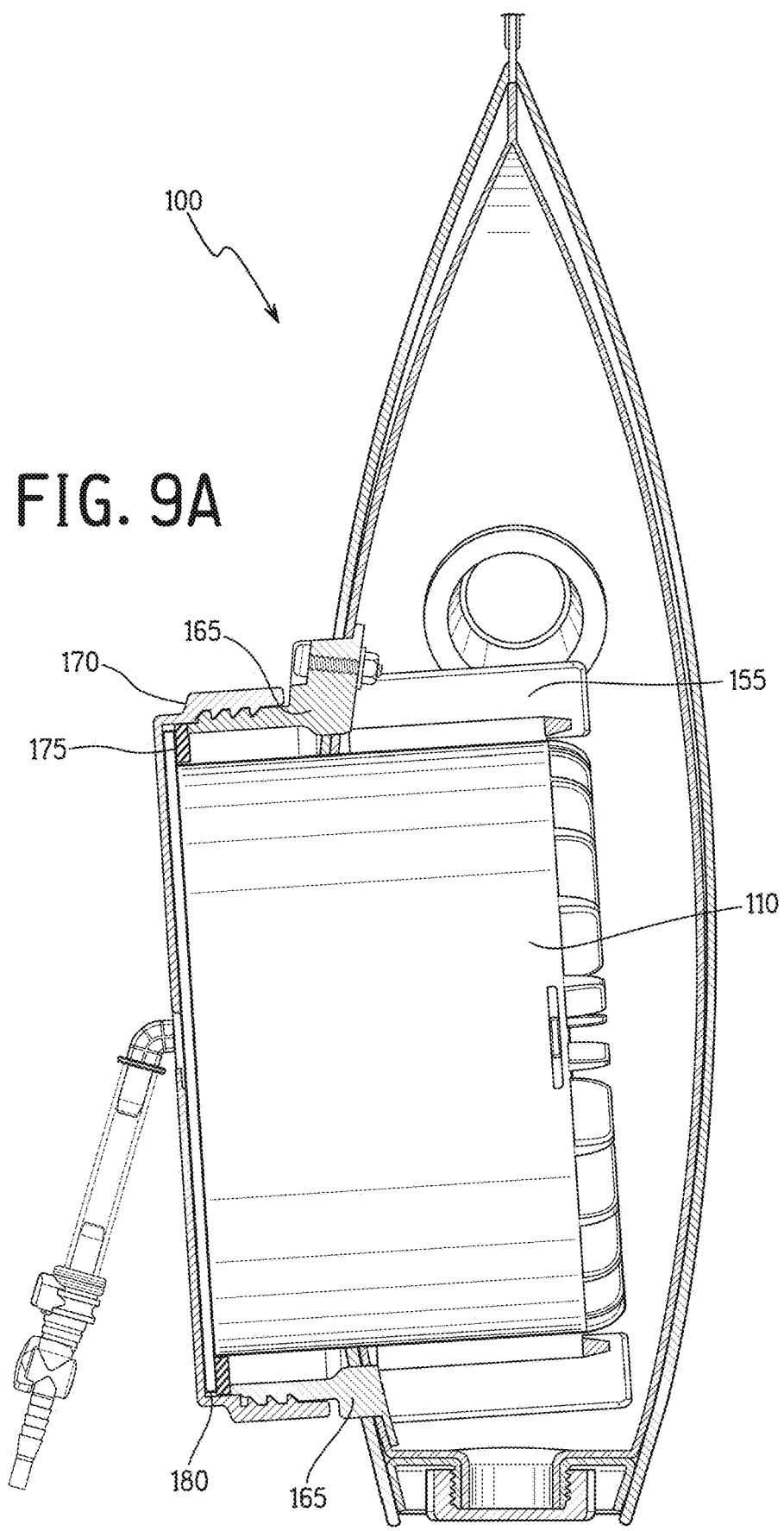

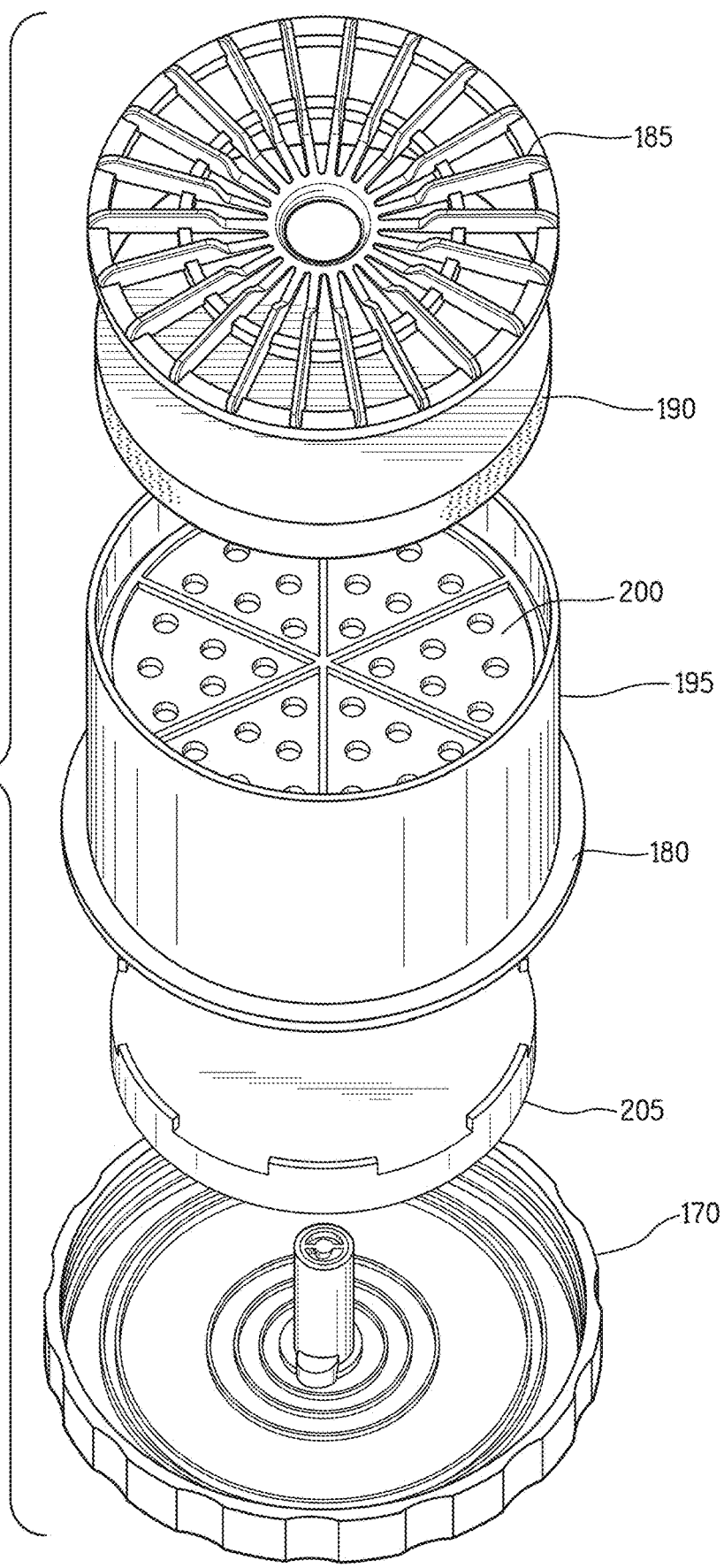

Individual segments making up the filter stack

PARTICLE FILTER SYSTEM

CROSS-REFERENCE TO RELATED APPLICATIONS

This patent application is a continuation-in-part of U.S. patent application Ser. No. 17/306,916 filed on May 3, 2021, Ser. No. 17/099,721 filed on Nov. 16, 2020, Ser. Nos. 16/735,615 and 16/735,629 both filed on Jan. 6, 2020, 62/948,784 filed on Dec. 16, 2019, and 62/936,111 filed on Nov. 15, 2019, which are incorporated herein by their entirety.

BACKGROUND OF THE INVENTION

Field of the Invention

The application relates to filtration devices for fluids such as liquid and gas and more particularly to filtration systems for drinking water and other liquids.

Background

In developing countries, about 80% of illnesses are linked to poor water and sanitation conditions. 1 out of every 5 deaths under the age of 5 worldwide is due to a water-related disease.

Clean and safe water is essential to healthy living, but clean drinking water remains inaccessible to many people in less industrialized countries that have lower per capita income levels than more developed countries.

Water pollution may include physical, chemical and biological pollutants such as turbidity, metals, organic matter and bacteria. Various technologies are used to remove contaminants including physical processes to remove pollutants by filtration, coagulation and flocculation, and disinfectant processes such as chlorination.

Referring to FIG. 16-18, traditional sediment filters are constructed with punched holes pore sizes of the same or similar sizes in a flat structure. Dust distribution is as per pore size if layered. Flow through the filter is generally in a straight line from the filter surface facing the inlet and out through the filter surface facing the outlet. Once the holes become blocked with sediment the flow rate reduces.

Various types of portable filter systems are available for clean drinking water. However, some small systems can have limited capacity or filtration lifespan and can also be fragile and/or expensive. Increasing the range of contaminants that require removal reduces the lifespan of a filter. Thus, a need exists for an improved portable water filtration system.

BRIEF SUMMARY OF THE INVENTION

The described filter allows broad spectrum contaminant removal while maintaining filtration capacity/lifespan which results in reduced costs per liter and device cost.

In one general aspect, an annular filter includes a first annulus wall and a second annulus wall being impermeable to fluid (liquid and gas), a first circular wall and a second circular wall mounted between the first annulus wall and second annulus wall wherein the first and second circular wall are permeable to fluid (liquid and gas), at least one dividing wall mounted between the first and second circular wall to divide an internal volume defined between the first and second annulus wall and the first and second circular wall into channels, bisecting walls between the first and second circular walls to change a direction of fluid flow from a first direction to a second direction first and second channels, turbulator walls mounted channel, wherein the turbulator walls cause turbulent fluid flow in the channels, and a filter media positioned in at least one of the channels.

Embodiments may include one or more of the following features. For example, the filter media may include adsorption particles or ion exchange media, such as, for example, activated carbon granules, activated alumina and/or ion exchange resin. As another feature the adsorption particles or ion exchange media may be confined to the channels by screens.

In one embodiment, first and second dividing walls divide the internal volume into first, second and third channels with the first and second dividing walls having an opening to fluidly connect the first, second and third channels thereby causing a maze-like fluid flow.

The turbulator wall may be turbulator wall pairs having opposing curled shapes in the channels. As another feature, raised walls may be positioned in the channels to prevent tunneling or channeling of the filter media.

In another embodiment, there are first, second and third dividing walls thereby divide the internal volume into first, second, third and fourth channel. The first, second and third dividing wall include an opening to fluidly connect the first, second, third and fourth channel thereby causing a maze-like fluid flow. The filter media is confined to the second channel and third channel and may be composed of more than one type of filter media.

As another feature, the dividing walls are concentrically mounted and bisecting walls are radially mounted relative to the first and second annulus wall.

In another general aspect, a filter having an internal volume includes a first frame wall and a second frame wall each having a hollow center portion and being impermeable to fluid, wherein fluid comprises liquid or gas, an outer perimeter wall and an inner perimeter wall mounted between the first and second frame walls to define the internal volume, the outer and inner perimeter wall being permeable to fluid, dividing walls mounted between the outer and inner perimeter wall to divide the internal volume into more than one channel, bisecting walls that terminates fluid flow in the channels, opening in the dividing walls that fluidly connect the channels; turbulator walls mounted the channels, wherein the turbulator walls cause a turbulent fluid flow in the channels, and a filter media positioned in at least one of the more than one channel.

Embodiments may include one or more of the above or following features. The filter media may include adsorption particles or ion exchange media confined to the channels by mesh or screen.

As another feature, two dividing walls divide the internal volume into first, second and third channels, and the first and second dividing walls have an opening to fluidly connect the first, second and third channel thereby causing a maze-like fluid flow.

Turbulator walls may be in pairs with opposing curled shapes in the channels. Raised walls may also be positioned in the channels to partially block a fluid flow in the channel.

There may be first, second and third dividing walls to divide the internal volume into first, second, third and fourth channels, and dividing walls have openings to fluidly connect the channels thereby causing a maze-like fluid flow, and a first filter media in the second channel and a second filter media in the third channel.

As another feature, turbulator wall pairs may cause z-shaped or s-shaped fluid flows in the channels.

As another feature, protrusion walls in the more than one channel that partially obstructs fluid flow.

In still another general aspect, a generally ring-shaped filter having an internal volume includes a first and second annulus wall being impermeable to fluid, a first and second circular wall mounted between the first and second annulus wall, wherein the first and second circular wall that are permeable to fluid, a first and second dividing wall concentrically mounted between the first and second circular wall to divide the internal volume into a first, second and third channel, at least one bisecting wall radially mounted in the first, second and third channel, an opening in the first and second dividing walls to direct a fluid flow from a first direction in the first channel, to a second direction in the second channel and to a third direction in the third channel, turbulator walls in the second channel to cause a turbulent fluid flow in the second channel, and filter media at least in the second channel.

Embodiments may include one or more of the above or following features. For example, the filter media may include adsorption particles or ion exchange media in the second channel. The second channel includes left, right, top and bottom walls with the turbulator walls causing turbulent fluid flow mounted to the left and right wall, and a partial raised wall on the top and bottom wall to prevent channeling or tunneling of filter media.

In one general aspect, a filter assembly includes an inlet end, a sediment (particle) filter having a sediment filter surface facing the inlet end and generally cylindrical filters. The sediment filter surface is orthogonal to each generally cylindrical filter surface.

Embodiments may include one or more of the following features. For example, the sediment filter may include a generally circular disk and the sediment filter surface may include a plane bounded by a circle. The sediment filter may have other shapes as needed, such as for example, a rectangular, square, triangular, polygon, etc. As another feature, the cylindrical filters may be positioned in in a concentric ring.

A first channel and a second channel may fluidly connect the sediment filter to the more cylindrical filters. The first channel can have a central axis that is orthogonal to a central axis to the more than one cylindrical filter. A central axis of the second channel may be in a direction along the length of the more than one cylindrical filter.

At least one of the cylindrical filters may include an annular ring of activated carbon. The cylindrical filters may also include a plurality of pleated media filters configured in a concentric ring.

An outlet tube in the center of the concentric ring may include a wall that causes a water flow to change direction from a direction that is orthogonal to a central axis of the pleated media filters to a direction that is parallel to a central axis of the pleated media filters. The wall of the outlet tube may cause the water flow to change to the opposite direction of the direction that is parallel to the central axis of the pleated media filters to exit the filter assembly through an outlet.

In another general aspect, a filter assembly includes an inlet end, a sediment (particle) filter having a sediment filtering surface facing the inlet end. The sediment filter includes a generally circular disk, cylindrical filters in a concentric ring, a channel to fluidly connect the sediment filter to the cylindrical filters, an outlet tube in the center of the concentric ring. The outlet tube includes a wall that causes a water flow to change direction from a direction that is orthogonal to a central axis of the cylindrical filters to a direction that is parallel to a central axis of the cylindrical filters in the direction of the sediment filter and to reverse direction away from the sediment filter to reach an outlet at the end of the outlet tube.

Embodiments may include one or more of the above or following features. For example, the sediment filter surface may be orthogonal to each cylindrical filtering surface of the cylindrical filters.

The cylindrical filters include an annular ring of a particulate matter, such as, for example, activated carbon, activated alumina and/or ion exchange resin and a plurality of corrugated media filters configured in a concentric ring inside the annular ring of activated carbon. The filed may be configured to remove physical contaminants, sediment, chemical, pharmaceutical, biological contaminants, radiological and metal contaminants, either in liquid or gas phases.

In still another general aspect, the filter assembly includes a circular intake cover to receive a flow of water from a container, a cylindrical wall attached to the circular intake cover, an inner ported circular wall within the cylindrical wall that divides the volume within the cylindrical wall into a sediment filter chamber and a cylindrical filter chamber, a sediment filter in the sediment filter chamber, cylindrical filters in a concentric ring in the cylindrical filter chamber, a cover wall in the cylindrical filter chamber that causes a flow of water from the sediment filter to change to a lateral direction toward the outside of the concentric ring, and a circular outlet tube inside the concentric ring of cylindrical filters that forces a water flow to change direction upward toward the sediment filter and then down again through an outlet port into an outlet chamber. Embodiments may include one or more of the above features.

In a further general aspect, a filter system includes a first filter, second and third filter with overlapping ranges of pore sizes. The first, second and third filter each include a fibrous layer having a first and second filter surface and a pair of surface layers sandwiching the first and second filter surface of the fibrous layer. The surface layers comprise a higher density than the fibrous layer. The surface layers of the first, second and third layers each include a first, second and third range of pore sizes, respectively. The second range of pore sizes is smaller than but overlaps with the first range of pore sizes and the third range of pore sizes is smaller than but overlaps with the second range of pore sizes.

Embodiments may include one or more of the following features. For example, the fibrous layer and the surface layers of the first, second and third filter may include edges that are bonded together. In another embodiment, surfaces of the fibrous layer and the surface layers are bonded together.

The fibrous layer of the first, second and third filter may include a web of entangled fibers configured as a three-dimensional layer and it may also have a substantially greater depth than the depth of the pair of surface layers.

The fibrous layer of the first, second and third filter may include polyethylene terephthalate, polypropylene, polyethylene terephthalate. The fibrous layers may also include a highly entangled fiber structure and/or a crystalline structure, such as, for example, pseudoboehmite.

The range of pore sizes of the second filter may be smaller than the range of pores sizes of the first filter by adding additional surface layers to the second filter and the range of pore sizes of the third filter may be smaller than the range of pores sizes of the second filter by adding additional surface layers to the third filter.

In another general aspect, a sediment (particle) filter system includes a series of segment layers each having a fibrous layer sandwiched between outer layers, wherein each of the series of segment layers includes different ratios of the material comprising the fibrous layer as compared to the material comprising the outer layers. The fibrous layer has a low density relative to the outer layers and the segment layers with higher compositions of outer layers include additional sheets of outer layers thereby decreasing the range of pore sizes.

Embodiments may include one or more of the following features. For example, the series of segment layers may include a first segment layer with a composition of between 50-95% fibrous layer and 5-50% outer layers, a second segment layer with a composition of between 40-85% fibrous layer and 15-60% outer layers, and a third segment layer with a composition of between 0-75% fibrous layer and 25-100% outer layers.

The series of segment layers may also include a first segment layer with a composition of 75% PET and 25% PP, a second segment layer with a composition of 55% PET and 45% PP, a third segment layer with a composition of 25% PET and 75% PP, and a fourth segment layer with a composition of 100% PP.

The outer layers may include polypropylene (PP) and the fibrous layer may include polyethylene terephthalate (PET). The low-density fibrous layers may be configured as a three-dimensional structure that allow dust, sediment or other particles to move through the fibrous layers in a circuitous direction. The circuitous path of particles through the fibrous layers can increase the particle storage capacity of the fibrous layers. In one general aspect, a water filter system, comprising includes a storage vessel having a fill port and a sediment drain and defining an internal volume with a fluid path between the fill port and the sediment drain, a filter housing comprising a cylindrical filter wall with an inlet end and an outlet end, a sediment filter disposed within the inlet end and having a sediment filter surface facing the inlet end, wherein a surface of the sediment filter is substantially parallel to the fluid path between the fill port and the sediment drain, more than one cylindrical filter proximate to the outlet end, the more than one cylindrical filter each having a cylindrical filter surface, wherein the sediment filter surface is orthogonal to each cylindrical filter surface, and a threaded cap that encloses the outlet end of the cylindrical filter wall and configured to receive the threaded collar on the storage vessel, the threaded cap having an exit port fluidly connected to a volume inside an innermost cylindrical filter surface. At least a portion of the filter housing is positioned within the internal volume of the storage vessel.

Embodiments may include one or more of the following features. For example, the sediment filter may be a generally circular disk and the cylindrical filter may include more than one filter in a concentric ring.

A first channel and a second channel may fluidly connect the sediment filter to the more than one cylindrical filter and the first channel has a first central axis that is orthogonal to a cylindrical filter central axis of the more than one cylindrical filter. The second central axis of the second channel is parallel to the cylindrical filter central axis.

The cylindrical filter may include an annular ring or annular ring filter having a first circular wall and a second circular wall mounted between a first annulus wall and second annulus wall. The annular ring is filled with adsorption particles, such as activated carbon granules and the first and second circular walls are permeable to water but retain the carbon granules.

A pair of dividing walls can be mounted between the first and second circular wall to divide the space into a first, second and third channel A bisecting wall can be attached between the first and second circular wall to the first and second dividing walls to change the direct of water flow from a first direction in the first channel, to second direction in the second channel and a third direction in the third channel.

Protrusion walls (turbulators) can be mounted in the second channel to partially obstruct and create fluid turbulence second channel. For example, the protrusions walls may comprise pairs of wedge-shaped or curling walls configured to cause a z-shaped or s-shaped water flow within the second channel Turbulators may be mounted to one or both first annulus wall and the second annulus wall. In another embodiment, protrusions may appear as wedge-shaped or icicles-shaped (stalactite and stalagmite) structures extending from the annular walls into the second channel.

The cylindrical filters may include a plurality of pleated media filters configured in a concentric ring inside the annular ring. As another feature, an outlet tube is in the center of the concentric ring, wherein the outlet tube comprises a wall that causes a water flow to change direction from a direction that is orthogonal to a central axis of the pleated media filters to a direction that is parallel to the central axis of the pleated media filters.

The storage vessel may be rectangular and/or may have a substantially vertical wall with an opening, wherein the filter housing is received within the opening of the vertical wall. The vertical wall can cause the sediment filter surface to be substantially parallel to the vertical wall such that non-buoyant particles bypass the sediment filter.

In another general aspect, a filter assembly for a fluid container includes a filter housing having a cylindrical filter wall with an inlet end and an outlet end, a sediment filter disposed within the inlet end and having a sediment filtering surface facing the inlet end, wherein the sediment filter comprises a generally circular disk, at least one cylindrical filter comprising an annular ring filter defining an internal volume at least partially filled with adsorption particles and having a first annulus wall and a second annulus wall being impermeable to water, a first circular wall and a second circular wall mounted between the first annulus wall and second annulus wall that are permeable to water but retain the adsorption particles, a dividing wall mounted between the first and second circular wall to divide the internal volume into a first and second channel, a bisecting wall attached between the first and second circular wall to change the direct of water flow from a first direction in the first channel to a second direction in the second channel, and more than one protrusion wall mounted in the second channel that partially obstructs the second channel thereby increasing turbulent water flow in the second channel.

Embodiments may include one or more of the above or following features. For example, turbulators may include pairs of walls configured to cause a z-shaped or s-shaped water flow within the second channel. The pairs may include mated curved surfaces. Each protrusion wall can be mounted to one or both first annulus wall and the second annulus wall.

As another feature, a channel may fluidly connect the sediment filter to the at least one cylindrical filter and an outlet tube can be in the center of the cylindrical filter. The outlet tube may include a wall that causes a water flow to change direction from a direction that is orthogonal to a central axis of the at least one cylindrical filter to a direction that is parallel to a central axis of the more than one cylindrical filter in the direction of the sediment filter and to reverse direction away from the sediment filter to reach an outlet at the end of the outlet tube.

A threaded cap can be configured to receive a threaded collar on the fluid container. The fluid container can have a fill port and a sediment drain, wherein the fluid container includes an internal volume that defines a first fluid path from the fill port to the sediment drain and a second fluid path from the inlet end through the sediment filter that is generally orthogonal to the first fluid path and wherein the fluid container receives at least a portion of the filter housing.

As another feature, the sediment filter surface may be orthogonal to each cylindrical filtering surface of the at least one cylindrical filter. The adsorption particles may include activated carbon granules.

The cylindrical filters may include a plurality of corrugated media filters configured in a concentric ring inside the annular ring filter.

In still another general aspect, an annular ring filter includes a first annulus wall and a second annulus wall being impermeable to water, a first circular wall and a second circular wall mounted between the first annulus wall and second annulus wall that are permeable to water, a dividing wall mounted between the first and second circular wall to divide an internal volume defined within the first and second annual wall and first and second circular wall into a first and second channel, a bisecting wall attached between the first and second circular wall to change a direct of water flow from a first direction in the first channel to a second direction in the second channel, and more than one protrusion wall mounted in the second channel, wherein the protrusion wall partially obstructs the second channel thereby increasing turbulent water flow in the second channel, wherein the internal volume is at least partially filled with adsorption particles.

Embodiments may include any one or more of the above or following features. For example, the adsorption particles comprise activated carbon granules.

In still another general aspect, a particle filter system includes a first filter segment that comprises five first filters, wherein each of the first filters includes a fibrous layer having a first and second filter surface, and a pair of surface layers sandwiching the first and second filter surface of the fibrous layer, the surface layers comprise a higher density than the fibrous layer, the surface layers each include a first range of pore sizes, and each of the first filters comprises a composition of 75% fibrous layer and 25% surface layers, a second filter segment that includes five second filters, wherein each of the second filters includes a fibrous layer having a first and second filter surface, and a pair of surface layers sandwiching the first and second filter surface of the fibrous layer, the surface layers comprise a higher density than the fibrous layer, the surface layers each include a second range of pore sizes, and the second range of pore sizes is smaller than but overlaps with the first range of pore sizes, and each of the second filters filter comprises a composition of 55% fibrous layer and 45% surface layers, and a third filter segment that comprises a plurality of third filters, wherein each of the third filters includes a fibrous layer having a first and second filter surface, and a pair of surface layers sandwiching the first and second filter surface of the fibrous layer, the surface layers comprise a higher density than the fibrous layer, the surface layers each include a third range of pore sizes, and the third range of pore sizes is smaller than but overlaps with the second range of pore sizes, and the third filter comprises a composition of 25% fibrous layer and 75% surface layers.

Embodiments may include one or more of the above or following features. For example, the fibrous layer and the surface layers of the first, second and third filter include edges that are bonded together. The surfaces of the fibrous layer and the surface layers of the first, second and third filter may also be bonded together.

As another feature, the fibrous layer of the first, second and third filter include a web of entangled fibers that comprise a three-dimensional layer. The fibrous layer of at least one of the first, second and third filter comprises a depth that is substantially greater than a depth of the pair of surface layers.

The fibrous layer of the first, second and third filter may be composed of polyethylene terephthalate, polypropylene, a highly entangled fiber structure, a crystalline structure, pseudoboehmite or some combination thereof.

The range of pore sizes of the second filter is smaller than the range of pores sizes of the first filter by adding additional surface layers to the second filter and the range of pore sizes of the third filter is smaller than the range of pores sizes of the second filter by adding additional surface layers to the third filter. The range of pore sizes of the second filter is smaller than the range of pores sizes of the first filter by adding additional surface layers to the second filter and the range of pore sizes of the third filter is smaller than the range of pores sizes of the second filter by adding additional surface layers to the third filter.

As another feature, the first filters in the first filter segment may include at least three first filters, the second filters in the second filter segment may include at least three second filters, and the plurality of third filters in the third filter segment comprise at least three third filters. The first filters in the first filter segment, second filters in the second filter segment and/or the third filters in the third filter segment may be in physical contact with each other without being bonded together. The first filter segment, second filter segment and third filter segment may also be in physical contact with each other without being bonded together.

In still a further embodiment, a particle filter system includes a first filter segment that comprises five first filters, wherein each of the first filters includes a fibrous layer having a first and second filter surface, and a pair of surface layers sandwiching the first and second filter surface of the fibrous layer, the surface layers comprise a higher density than the fibrous layer, the surface layers each include a first range of pore sizes, and each of the first filters comprises a composition of 75% fibrous layer and 25% surface layers, a second filter segment that includes a plurality of second filters, wherein each of the second filters includes a fibrous layer having a first and second filter surface, and a pair of surface layers sandwiching the first and second filter surface of the fibrous layer, the surface layers comprise a higher density than the fibrous layer, the surface layers each include a second range of pore sizes, and the second range of pore sizes is smaller than but overlaps with the first range of pore sizes, and each of the second filters filter comprises a composition of 55% fibrous layer and 45% surface layers, and a third filter segment that comprises a plurality of third filters, wherein each of the third filters includes a fibrous layer having a first and second filter surface, and a pair of surface layers sandwiching the first and second filter surface of the fibrous layer, the surface layers comprise a higher density than the fibrous layer, the surface layers each include a third range of pore sizes, and the third range of pore sizes is smaller than but overlaps with the second range of pore sizes, and the third filter comprises a composition of 25% fibrous layer and 75% surface layers. Embodiments may include one or more of the above or following features.

In another general aspect, a particle filter system includes a first filter segment that comprises more than one first filter, wherein each first filter includes a fibrous particle storage medium between a pair of first surface filter layers having a first range of pore sizes, only edges of each more than one first filter are fixed together while each first filter is in physical contact with each proximate first filter, a second filter segment that comprises more than one second filter, wherein each second filter includes a fibrous particle storage medium between a pair of second surface filter layers, only edges of each more than one second filter are fixed together while each second filter is in physical contact with each proximate second filter, a third filter segment that comprises more than one third filter, wherein each third filter includes a fibrous particle storage medium between a pair of third surface filter layers, only edges of each more than one third filter are fixed together while each third filter is in physical contact with each proximate third filter. Embodiments may include one or more of the above features.

BRIEF DESCRIPTION OF THE SEVERAL VIEWS OF THE DRAWINGS

FIGS. 8, 9A and 9B illustrate partial cross-sectional views of the portable water filtration system.

FIG. 10 shows an exploded view of a water filter assembly according to an embodiment of the present invention.

DETAILED DESCRIPTION OF THE INVENTION

Figure 1:
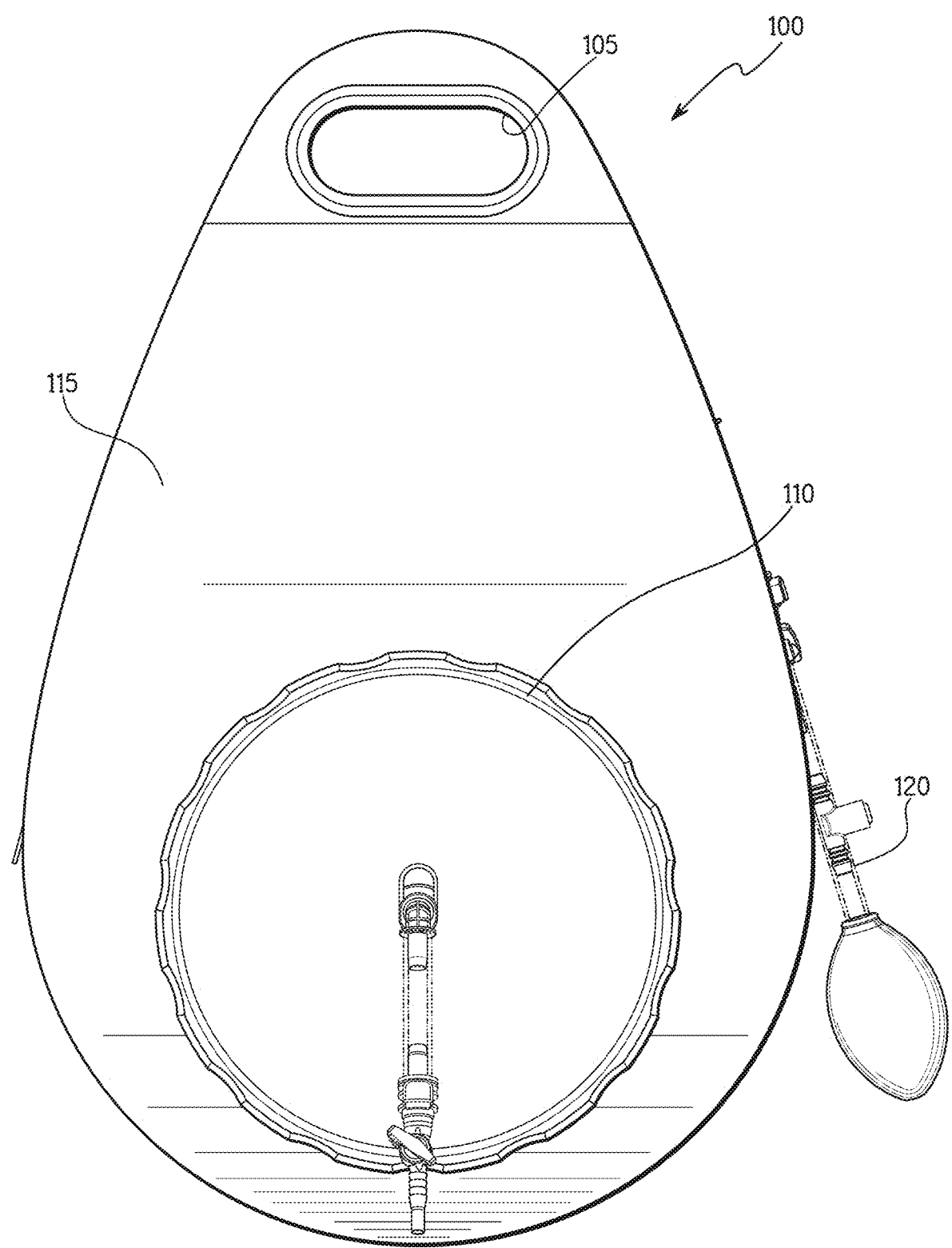
FIGS. 1-6 illustrate a portable water filtration system according to an embodiment of the present invention.
Figure 2:
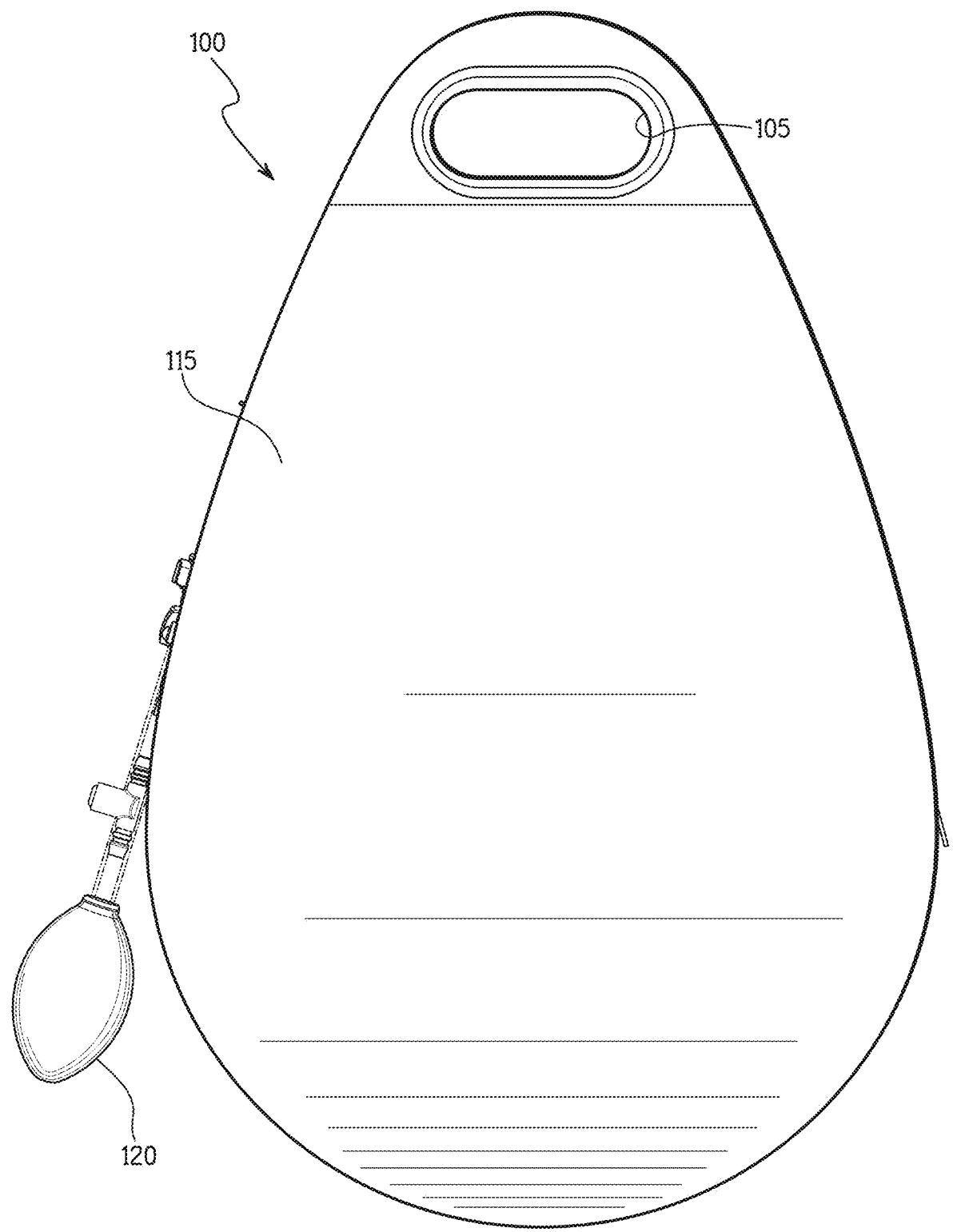

Referring to FIGS. 1-6, a portable water filtration system 100 can be used in areas where potable water systems are not available. The system 100 includes a handle 105, a filter assembly 110 and a container vessel 115 that holds a volume of water. A pump 120 can be used to pressurize the vessel 115 to facilitate water flow through the filter assembly 110.

Figure 3:
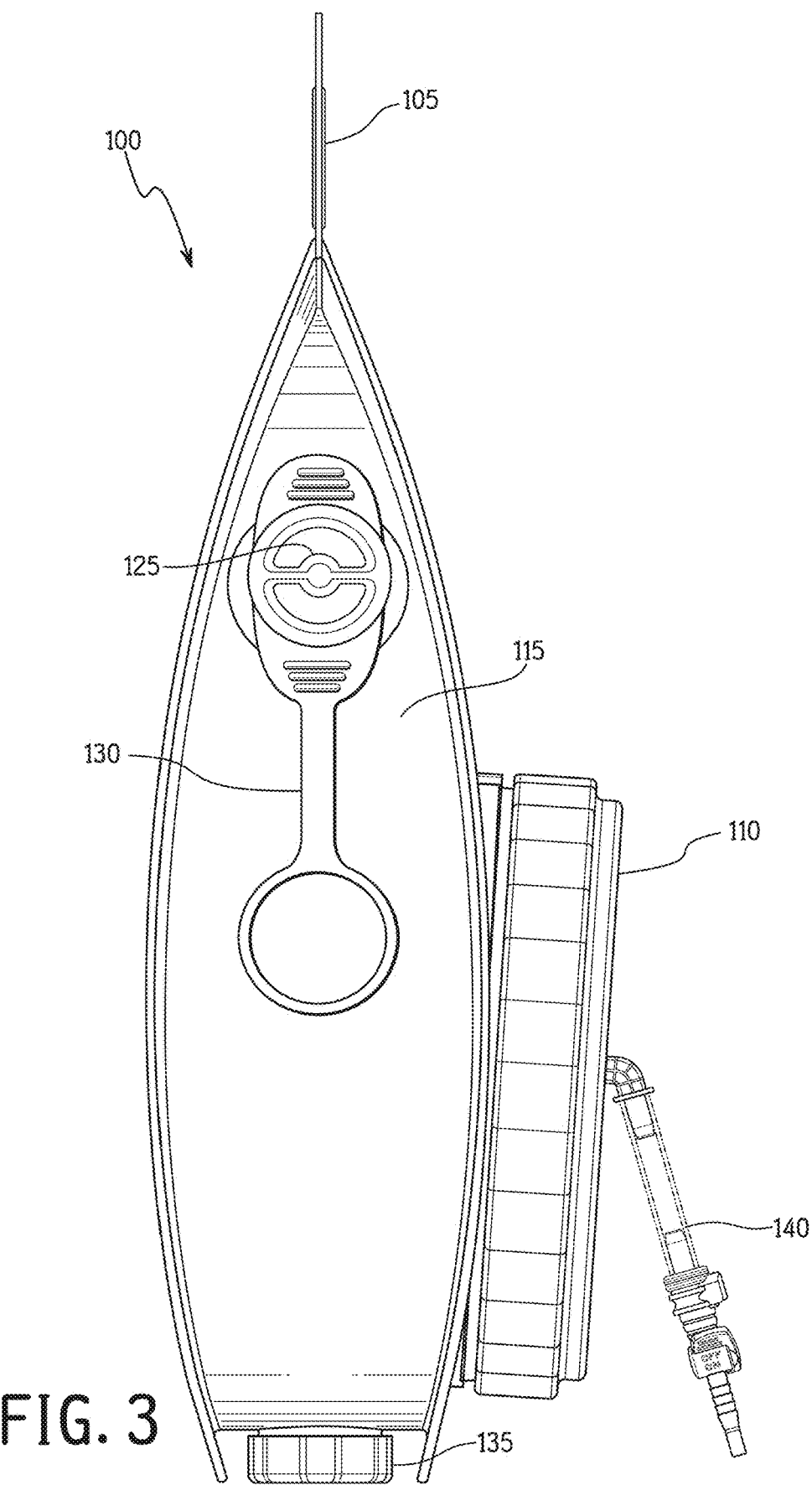

Referring to FIG. 3, the vessel 115 has a fill port that is covered by a cap 125. A retainer ring 130 is used to retain the cap 125. A sediment drain covered by a drain cap 135 is positioned at the bottom of the vessel 115. An outlet hose 140 is installed in an outlet of the filter assembly 110.

Figure 4:
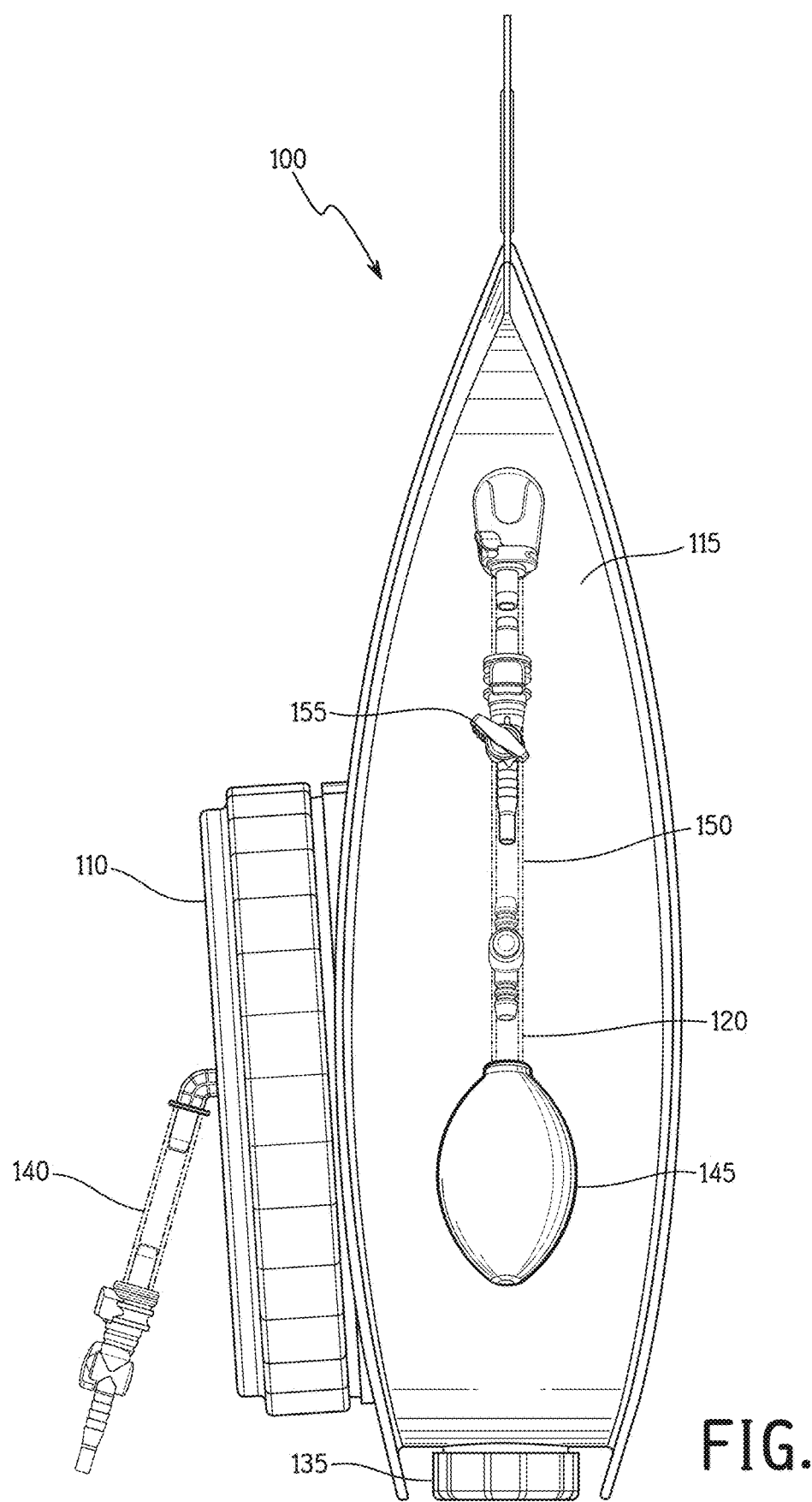
Figure 5:
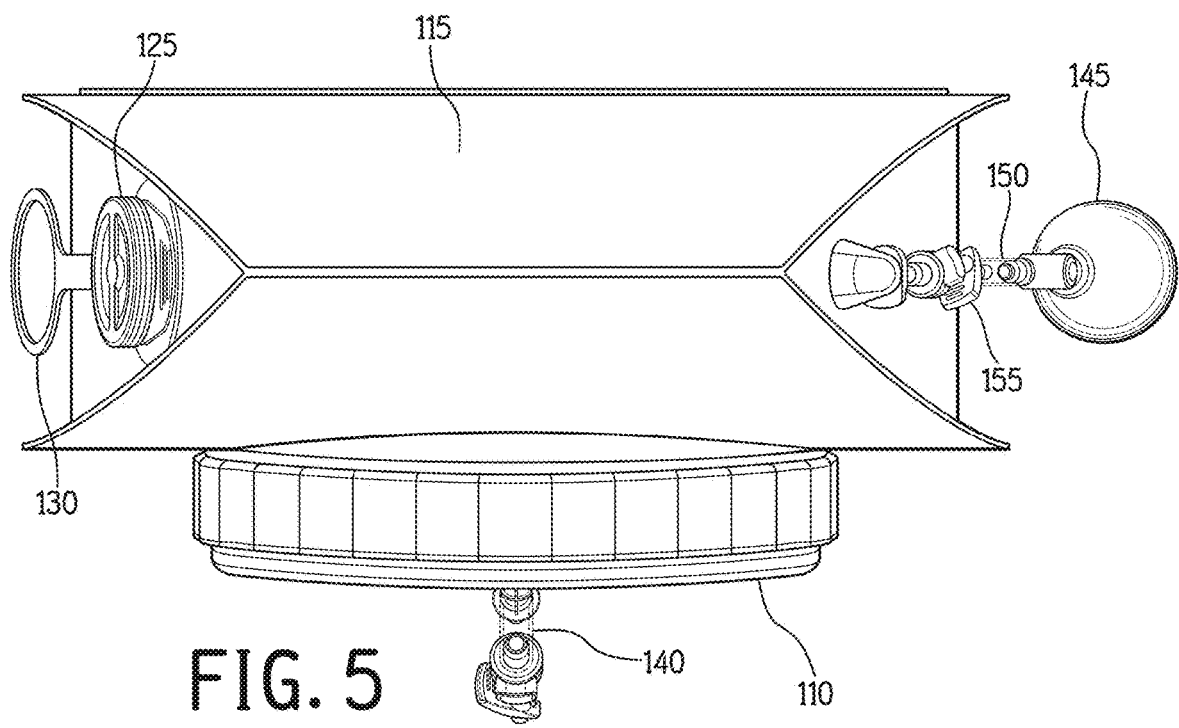
Figure 6:
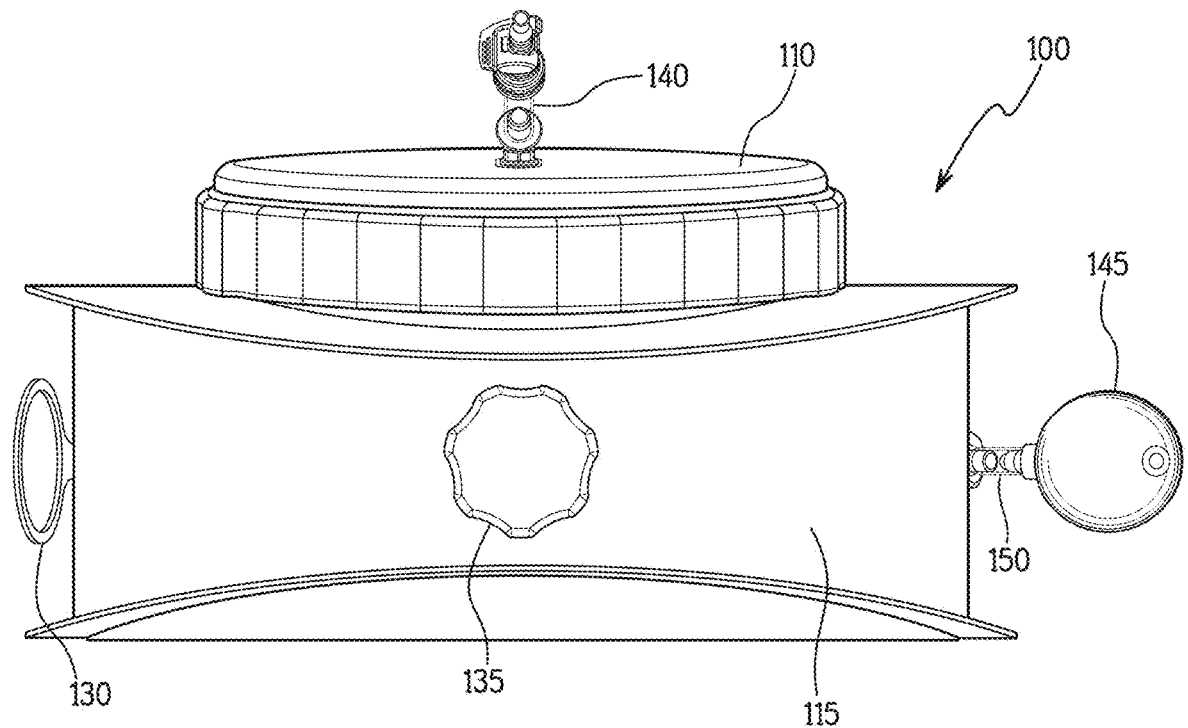

Referring to FIG. 4, the pump 120 includes a squeezable bulb 145, a pressure hose 150 and a valve actuated by a butterfly handle 155. The valve can seal the vessel 115 to maintain pressure.

Figure 7:
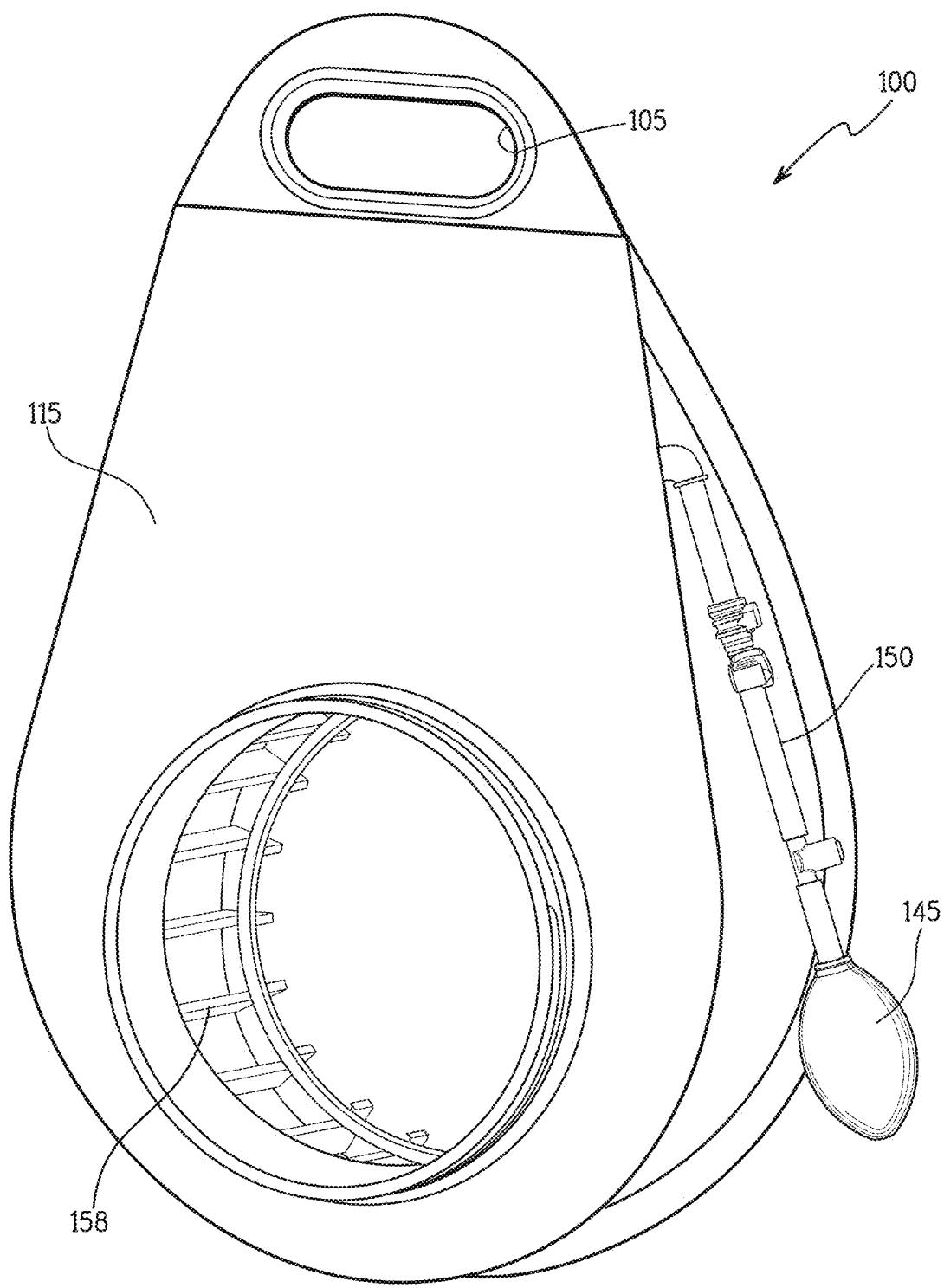
FIG. 7 shows a protective filter cage of the portable water filtration system.
Figure 14:
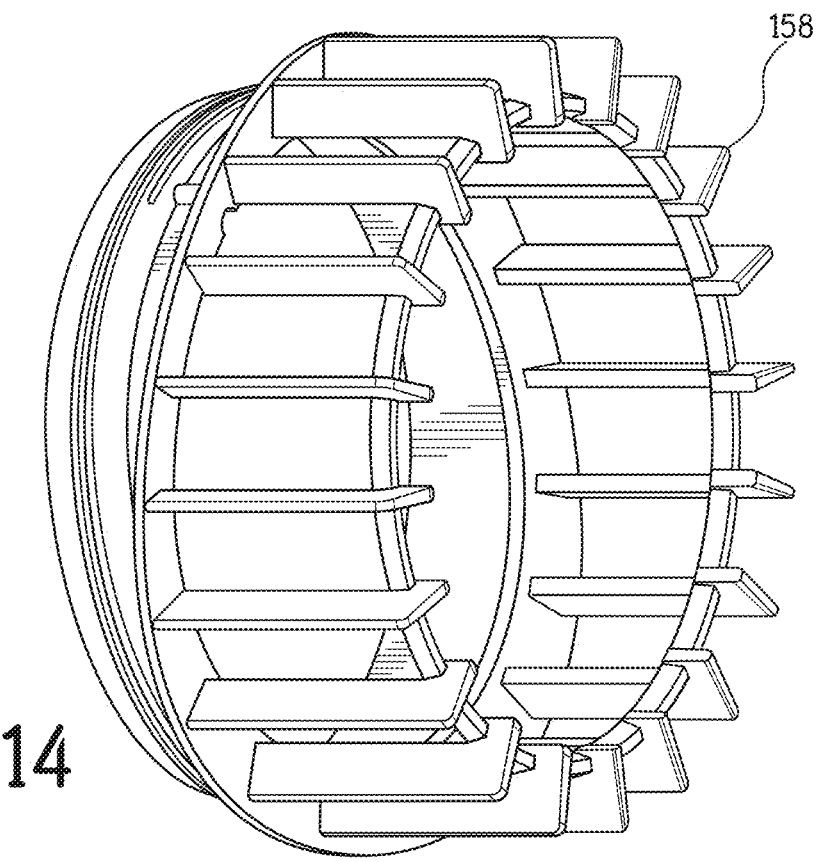
FIGS. 14 and 15 illustrate perspective and cross-sectional views of a protective filter cage of the water filter assembly.
Figure 15:
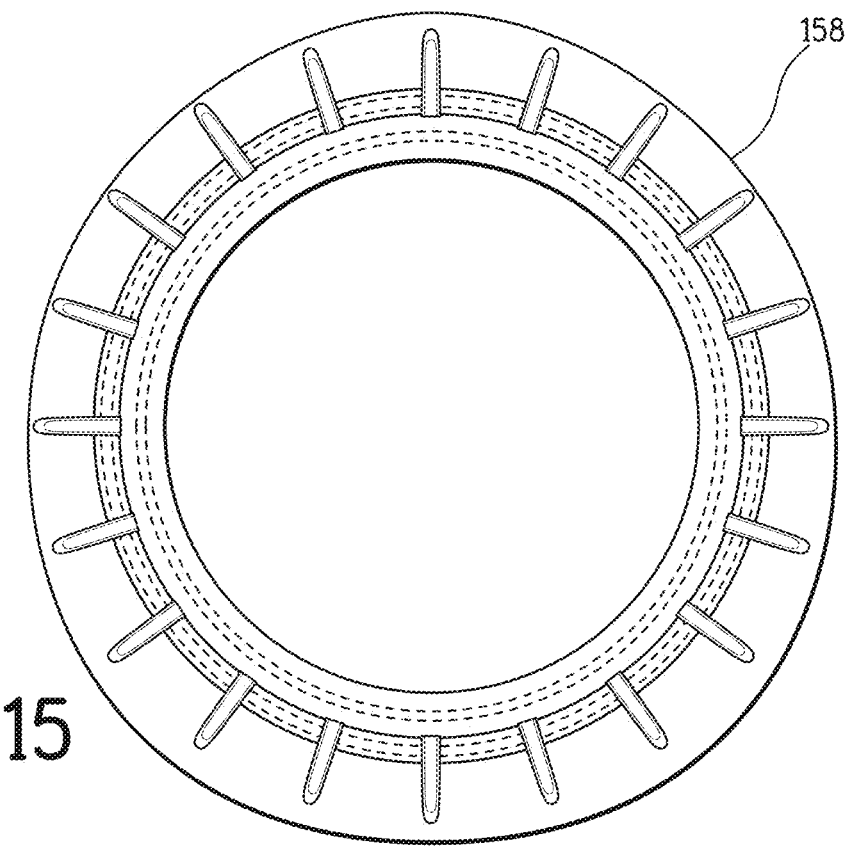
Figure 16:
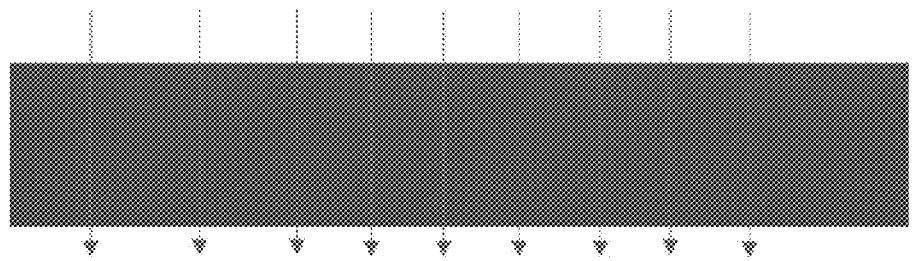
FIG. 16 illustrates a cross-sectional view of a conventional filter.
Figure 17:
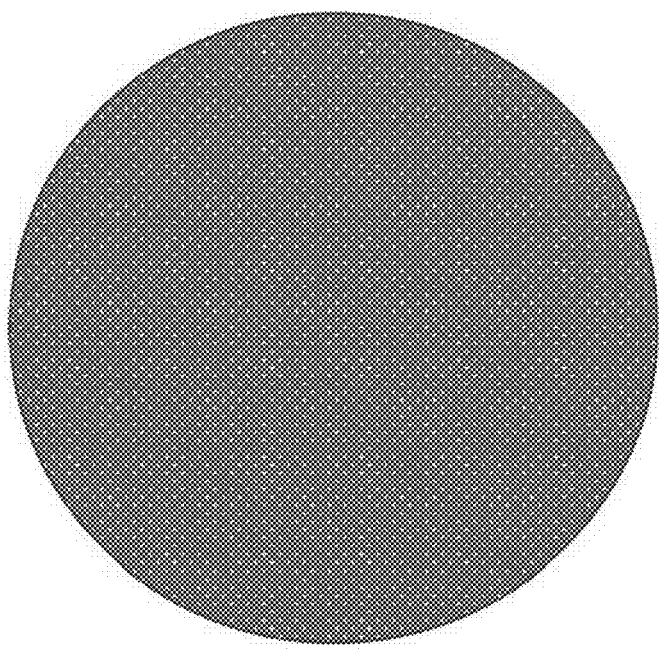
FIGS. 17 and 18 show surface views of a conventional filter.
Figure 18:
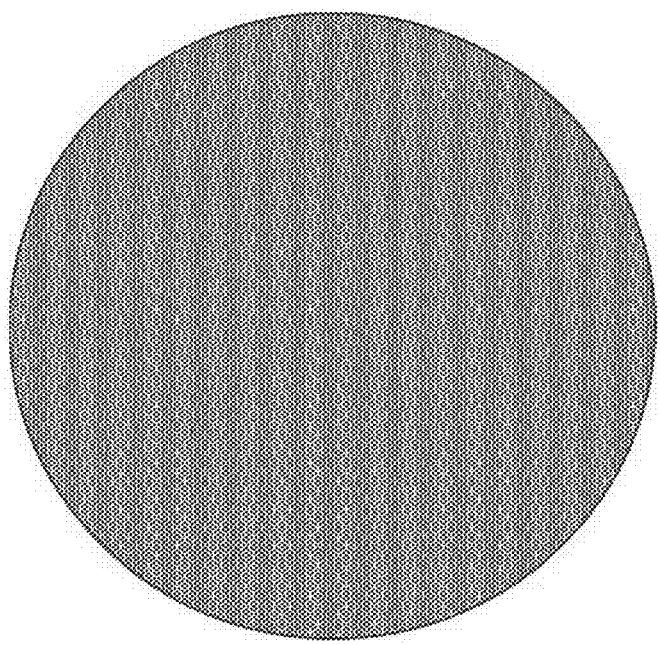

Referring to FIGS. 7, 14 and 15, a protective cage 158 surrounds the filter assembly (not shown). The cage 158 includes a series of ribs that encircle the filter assembly. This protects the filter assembly against impact, such as, for example, if the container 100 is dropped.

Figure 8:
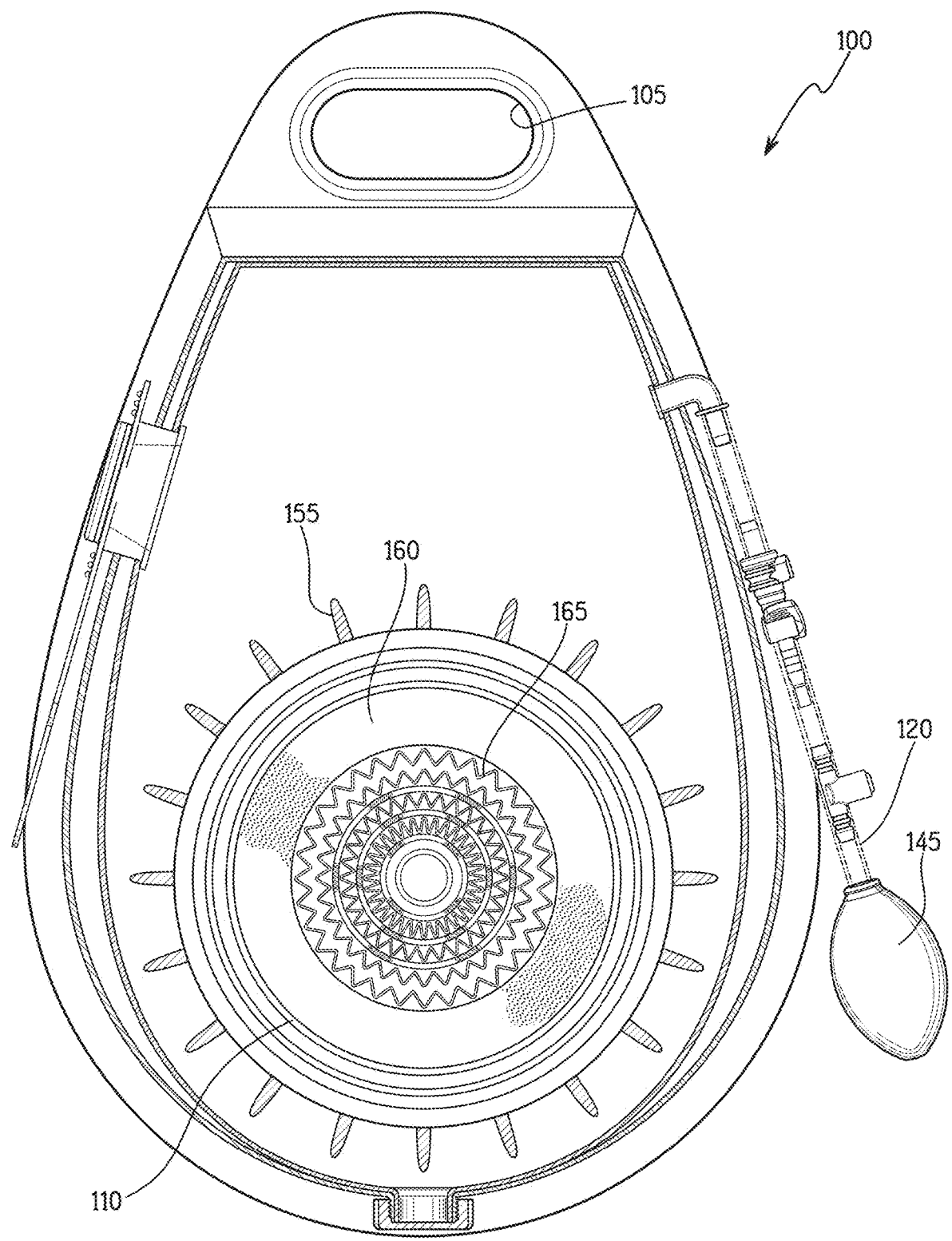

Referring to FIG. 8, the filter assembly 110 include a carbon ring 160 and a series of corrugated filters 165 in a concentric ring. As will be described in more detail below, water flows from the outside to the inside of the concentric ring of filters to an exit port.

Figure 9B:
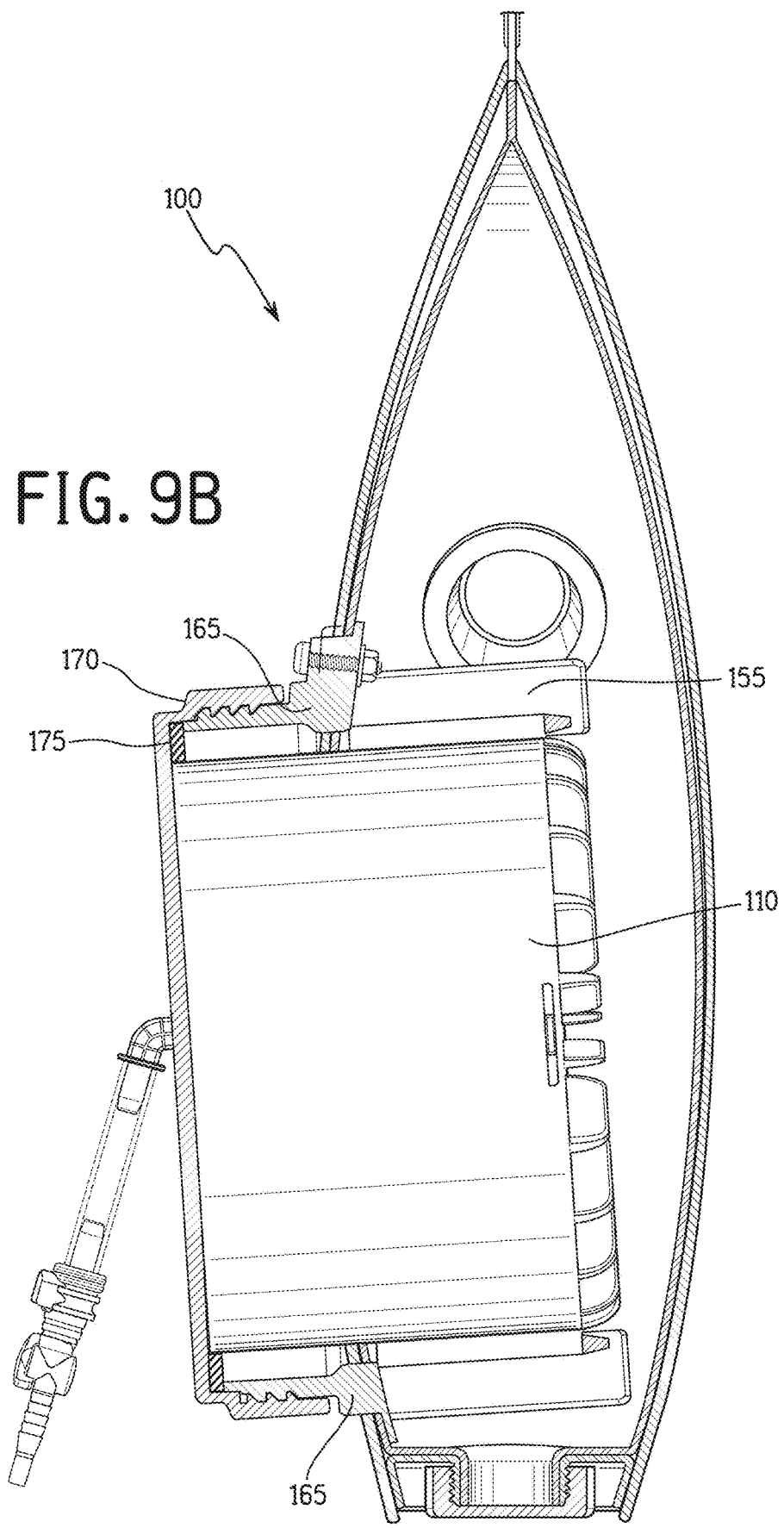

Referring to FIG. 9A, the filter assembly 110 is positioned in a threaded collar 165 attached to the container 110. A threaded cap 170 is screwed into the threaded collar 165 to secure the filter assembly 110 in the container 110. A sealing ring 175 or gasket is positioned between the threaded cap and a lip 180 of the filter assembly 110 so that the filter assembly is clamped between the threaded collar 165 and the threaded cap 170 for a watertight seal. Referring to FIG. 9B, the threaded cap is integrated into the filter assembly 110 so that the entire filter assembly 110 screws into the collar by rotating the integrated cap.

Figure 11:
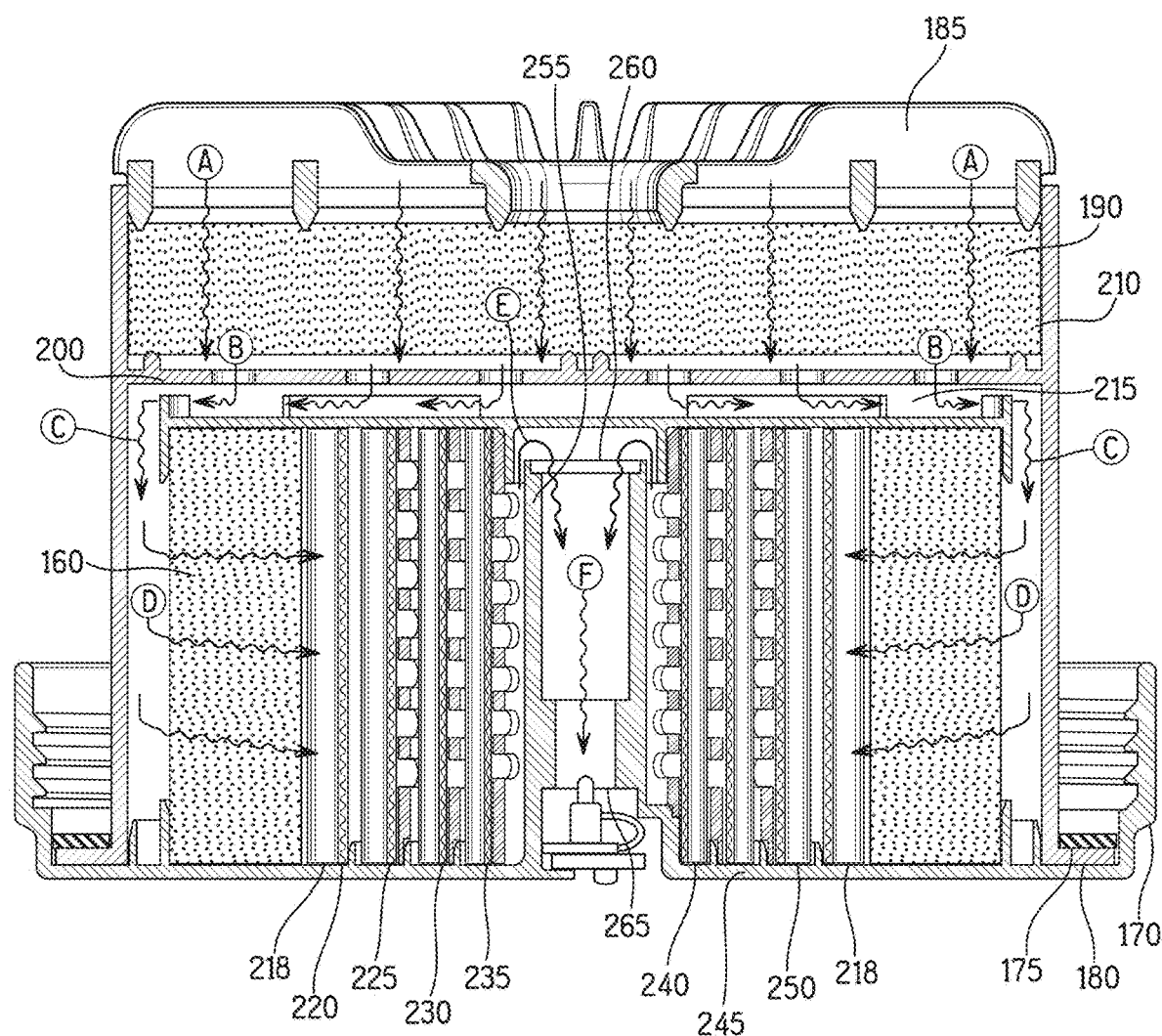
FIG. 11 shows a cross-sectional view of the water filter assembly.

Referring to FIGS. 10 and 11, the filter assembly 110 includes a circular intake cover 185, a sediment filter 190, a generally cylindrical wall 195, an inner circular wall 200 and a cover wall 205 over the concentric filters. The circular intake cover 185 has a series of ribs and openings that allow water to flow from the vessel 115 into the filter assembly 110. The inner circular wall 200 separates the filter assembly into a sediment filter chamber 210 and a concentric ring filter chamber 215. The inner circular wall 200 has a series of ports to allow water to flow from the sediment filter chamber 210 to the concentric ring filter chamber 215.

The generally cylindrical wall 195 may have straight or parallel sides and a circular or oval cross-section in the shape or form of a cylinder. However, it may have other rectangular shafts or notches.

The sediment filter 190 is positioned in a vertical orientation with respect to the height of the vessel 115. Thus, heavy sediment bypasses the sediment filter 190 and falls directly to the sediment drain thereby extending the life of the sediment filter 190.

Referring to FIG. 11, water flows through the intake cover 185 from the vessel 115 into the sediment filter chamber 210 in the direction shown by Arrow A. Water then flows from the sediment filter chamber to the concentric ring filter chamber 215. The cover wall 205 over the concentric filters is a solid circular wall that diverts the flow of water from a downward to a lateral direction toward the outside of the concentric ring filter chamber 215 as shown by Arrow B. The water then flows downward between the cylindrical wall 195 and the outside surface of the carbon ring 160 in the direction of Arrow C. The carbon ring 160 includes activated carbon and may be a composition of materials, such as, for example, carbon with embedded silver. Other types of filter media may be used instead of or in addition to carbon, such as, for example, an ion-exchange resin or ion-exchange polymer.

Water flows through the carbon ring 190 from the outside to the inside in the direction of Arrow D. Water then flows through a perforated dividing wall 218 into the concentric ring of corrugated filters 165.

The embodiment shown in FIG. 11 has a series of four corrugated filters 220, 225, 230 and 235. The filters 220, 225, 230 and 235 are spaced apart by dividing walls 240, 245, and 250.

Figure 12:
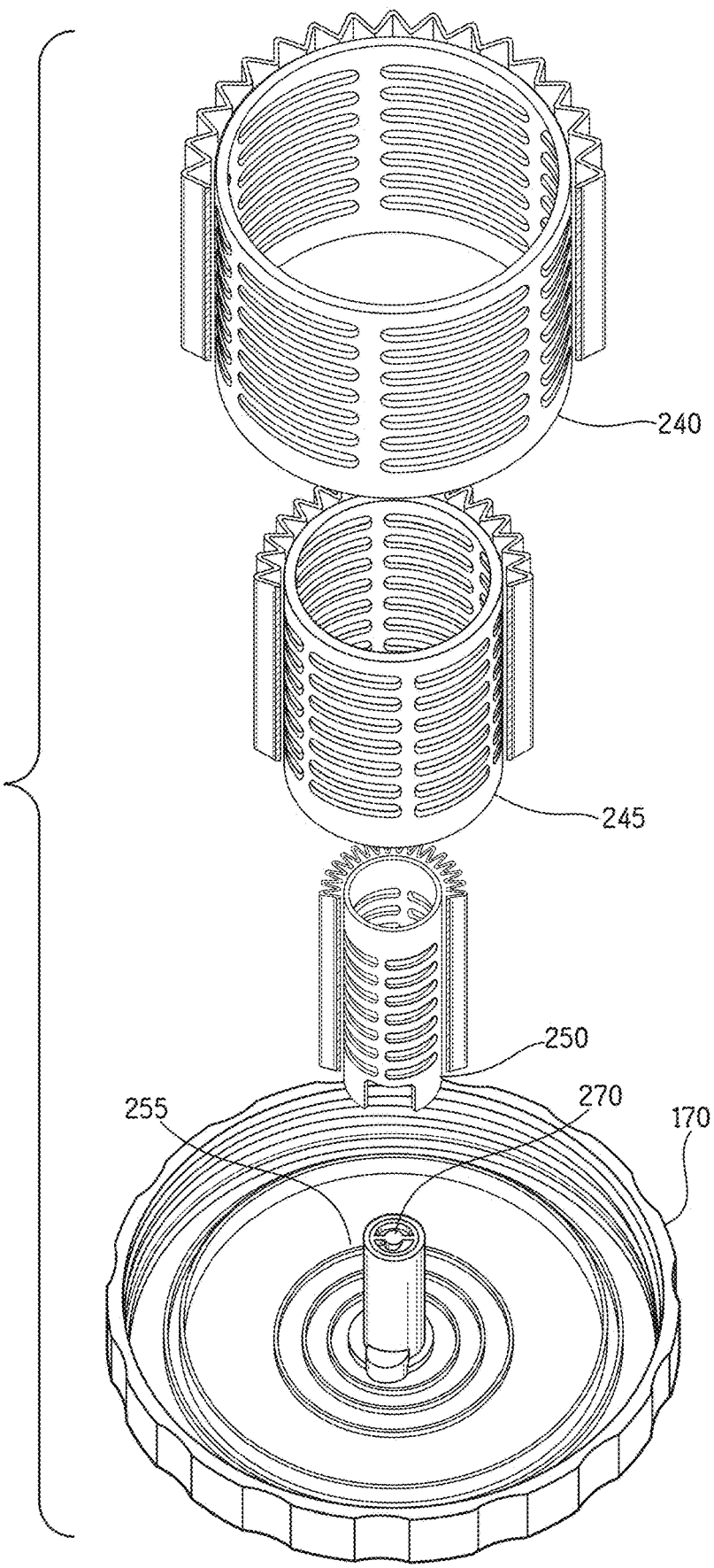
FIG. 12 is an exploded view of concentric filters of the water filter assembly.

As shown in FIG. 12, each of the perforated dividing walls 218, 240, 245, and 250 has ports or slots that allow the flow of water toward the center of the concentric rings. A circular outlet tube 255 is positioned at the center of the perforated dividing walls 218, 240, 245, and 250. In other embodiments, additional dividing walls may be added or dividing walls may not be used. One or more of the concentric filters 220, 225, 230 and 235 may be configured to remove suspended matter, microbiological matter and/or chemicals.

Referring again to FIG. 11, a circular outlet tube 255 forces the water to change direction upward toward the sediment filter 190 and then down again through an outlet port 260 into an outlet chamber as shown by Arrow E. Water then flows down toward an exit port 265 in a direction to exit the container 100 as shown by Arrow F.

Figure 13:
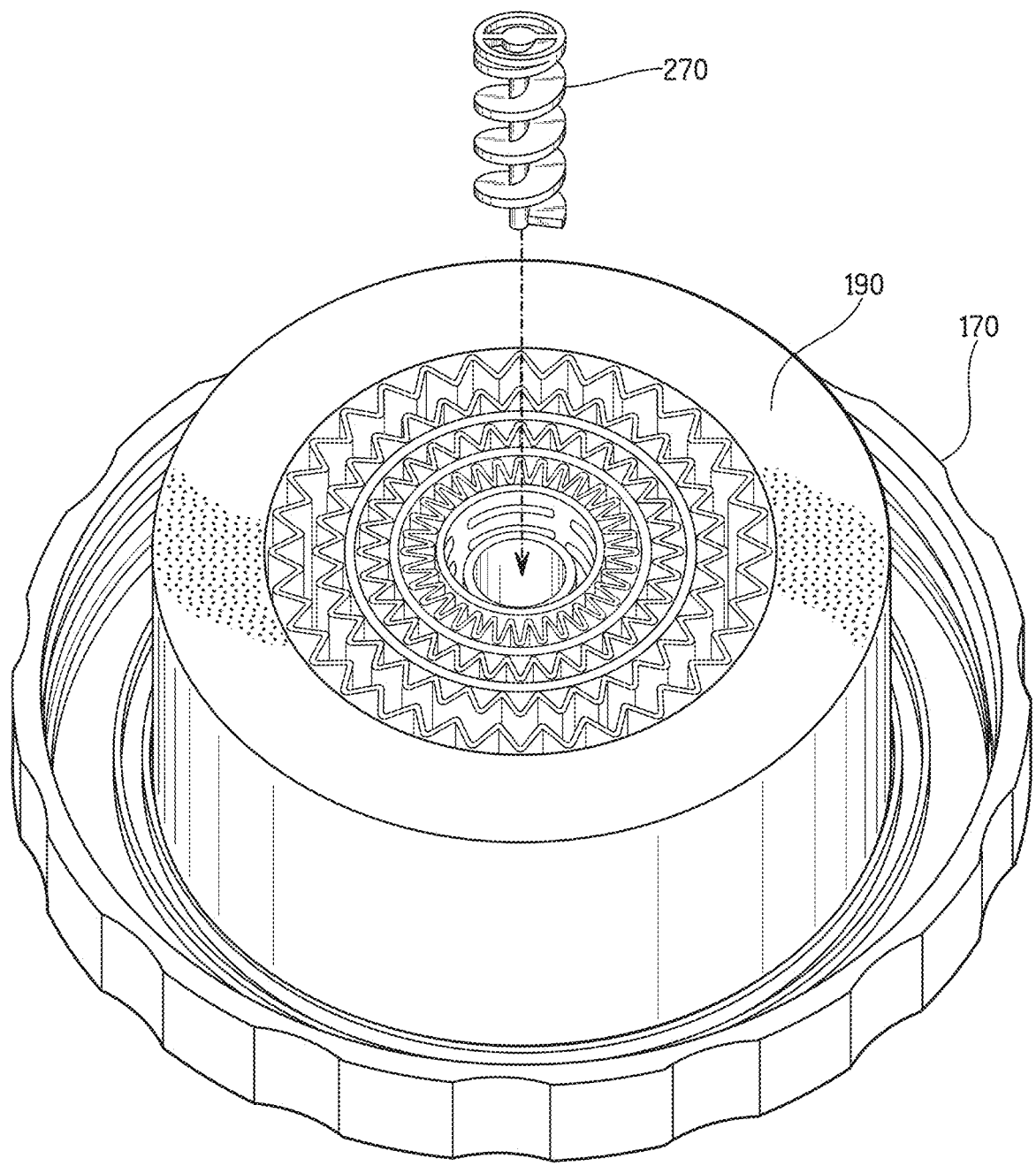
FIG. 13 is a perspective view of the water filter assembly.

Referring to FIG. 13, a spiral flow agitator component 270 is positioned in the circular outlet tube 255. The agitator component 270 causes turbulence so that water has increased contact with a disinfectant media in the outlet tube 255. In another embodiment, the agitator component may also include disinfection media.

Figure 19:
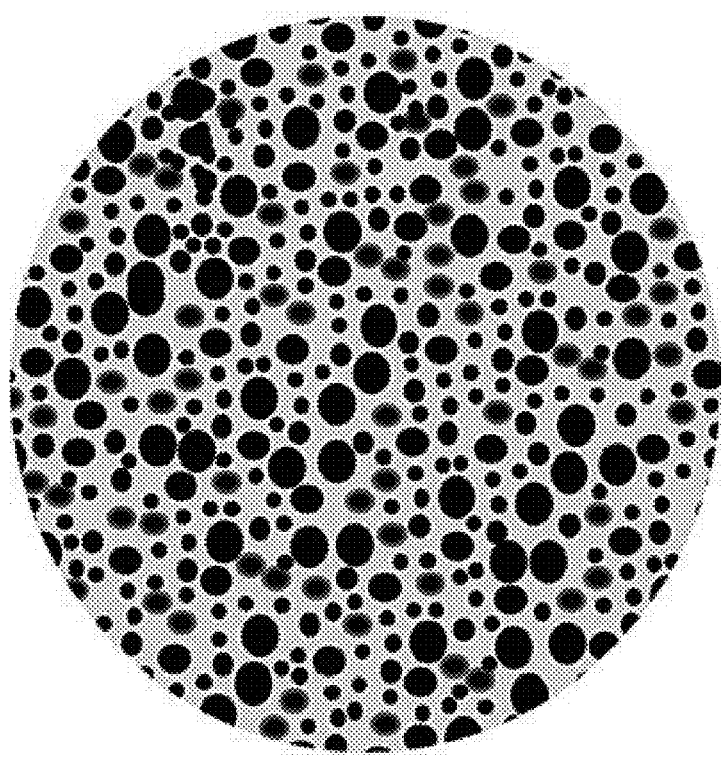
FIGS. 19 and 20 illustrate surface views of a sediment filter according to an embodiment of the present invention.
Figure 20:
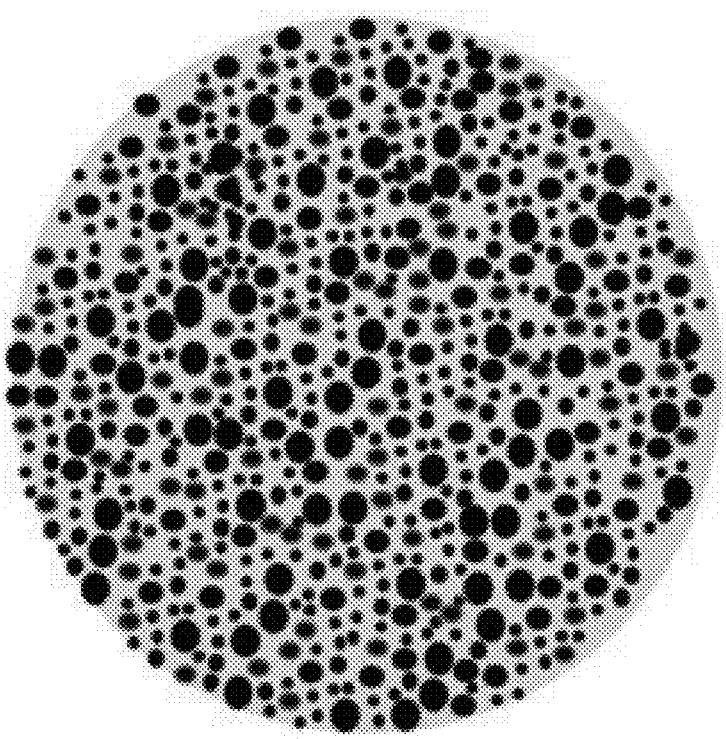

Referring to FIGS. 19 and 20, the filter material is designed with a larger range of pore sizes than that of a conventional filter. The range of pore sizes shown in FIG. 19 are generally larger than that shown in FIG. 20, however, the range of pore sizes can overlap.

Figure 21:
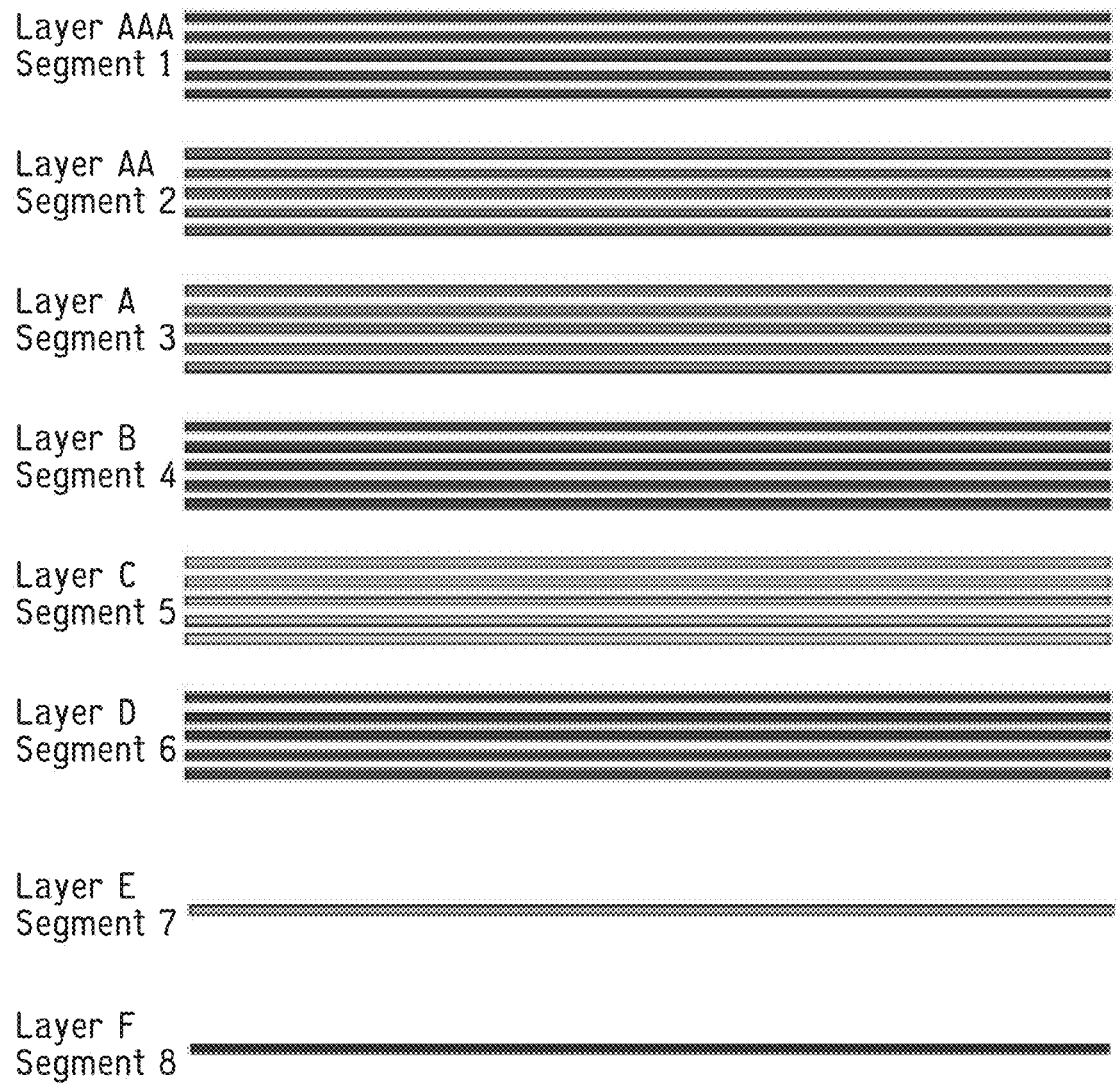
FIGS. 21-23 show segment layers of the sediment filter.

FIG. 21 shows various filter media segment layers that make up the sediment (particle) filter. Generally, the range of pore sizes of the surface material making up each filter segment layer AAA, AA, A, B, C, D, E and F generally get smaller. In one embodiment, some of the segment layers AA, A, B, C, E and F are made up of varying amounts of a first surface material sandwiching a second filter material.

The range of pore sizes of the first surface material can be adjusted by adding or subtracting various layers of a filter media together, such as, for example, layers of a melt blown polypropylene (PP) web. The degree of fiber-entanglement, fiber diameter and density of the melt blown web can also be used to vary effective pore sizes of the PP. In another embodiment, spun bond fabric may be used in addition to or to replace the PP when, for example, additional strength is needed.

In the embodiment that is shown in FIG. 21, segment layers AAA, AA, A, B, C and D include four individual layers that make up each of the segment layers. In different embodiments the four individual layers may have surfaces that are bonded to each other to make up the segment layer or they may be stacked on each other so that they contact adjacent individual layers without being bonded together. In another embodiment, the surfaces of the individual layers are tacked to adjacent individual layers in discrete locations such as in the center of each layer and at the edges.

Figure 22:
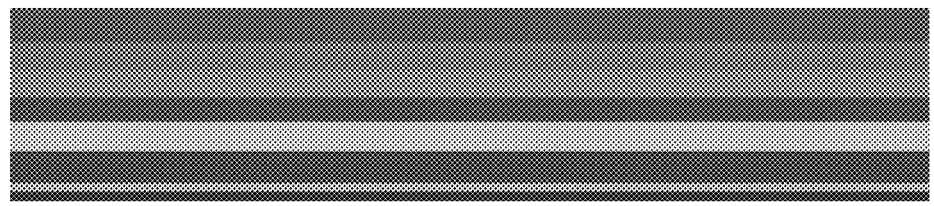
Figure 23:
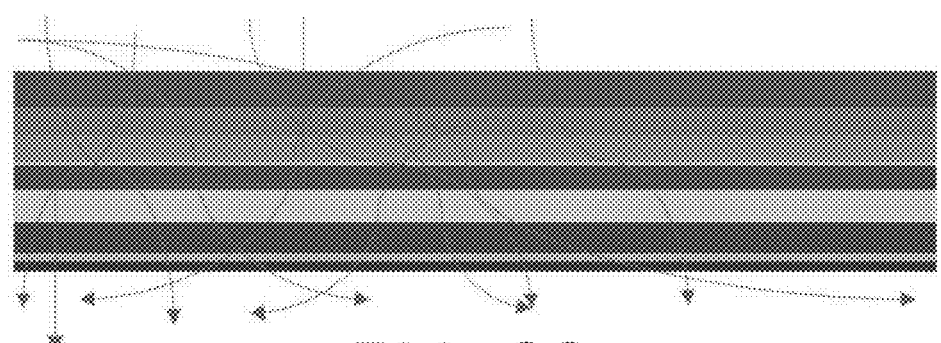

Referring to FIGS. 22-23, the filter media segment layers AAA, AA, A, B, C, D, E and F are stacked together. Each segment AAA, AA, A, B, C, D, E and F is in contact with adjacent segment layers, but the surfaces of the segment layers are not bonded together.

Figure 24:
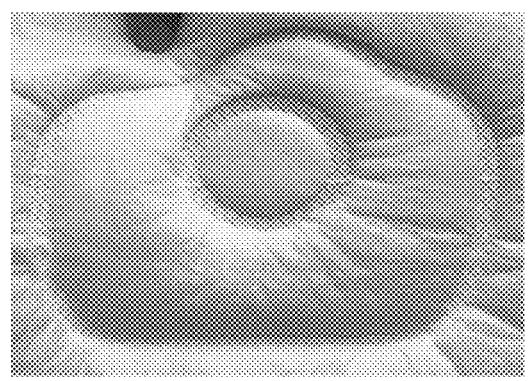
FIGS. 24 and 25 show surface and cross-sectional views of the sediment filter.

Referring to FIG. 24, the filter media segment layers are stacked and cut together in a desired shape. For example, the segment layers may be stacked, and an ultrasonic cutter may be used. A seal or bond at the edges of the segment layers may be formed during the cutting process. In other process, a form of heat welding may be used to bond the segment edges together.

Figure 25:
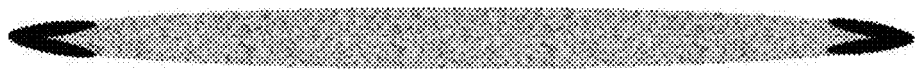
Figure 26:
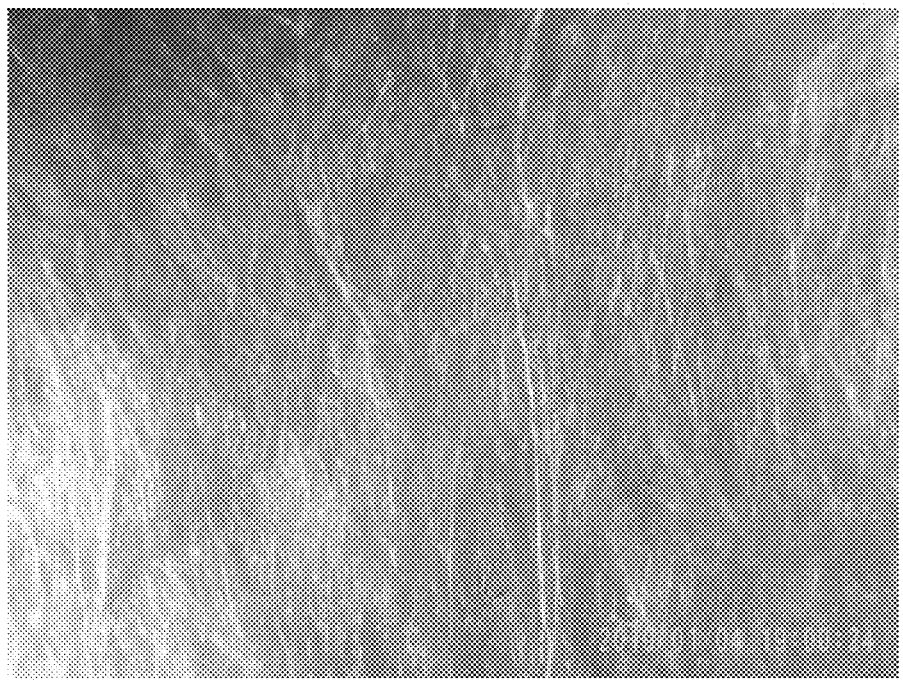
FIGS. 26-28 illustrate surface, cut-away and full stack profile views of segment layers AA, A, B, C and D of the sediment filter.
Figure 27:
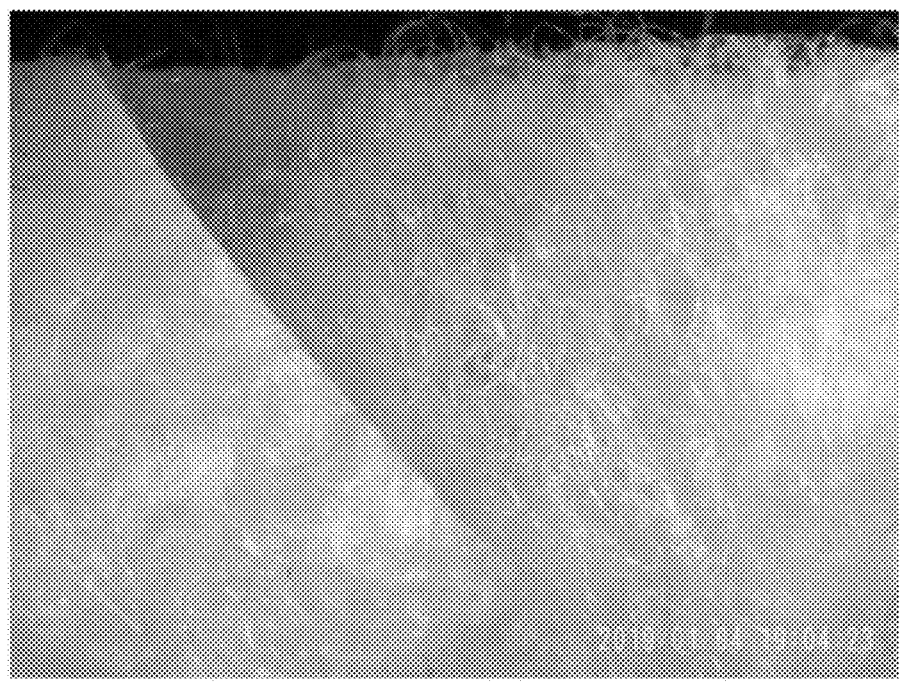
Figure 28:
Figure 29:
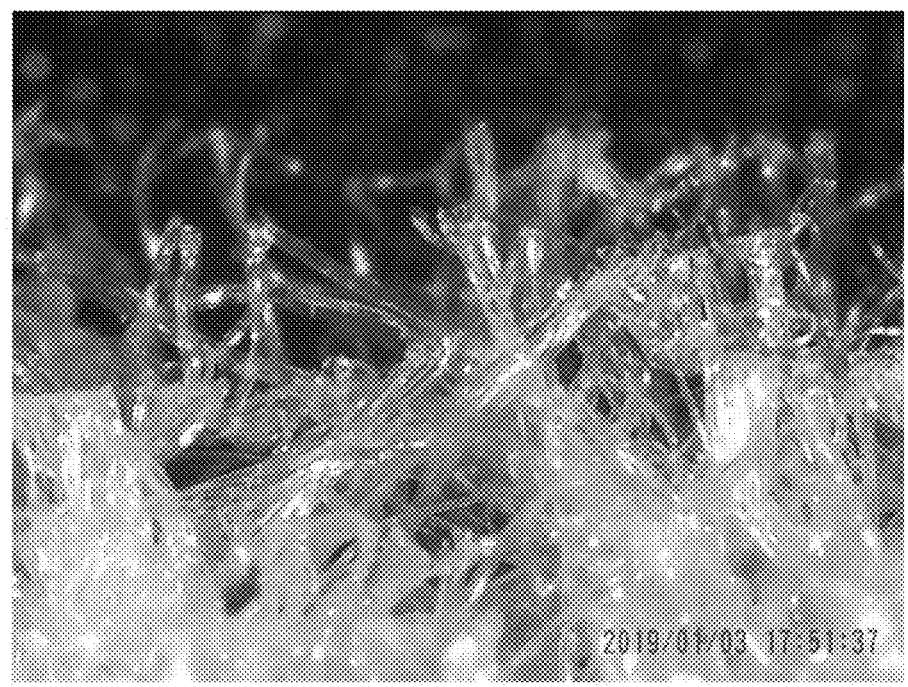
FIGS. 29-33 show cross-section, layered surface, single layer surface, profile and stack profile views of segment layer AAA of the sediment filter.
Figure 30:
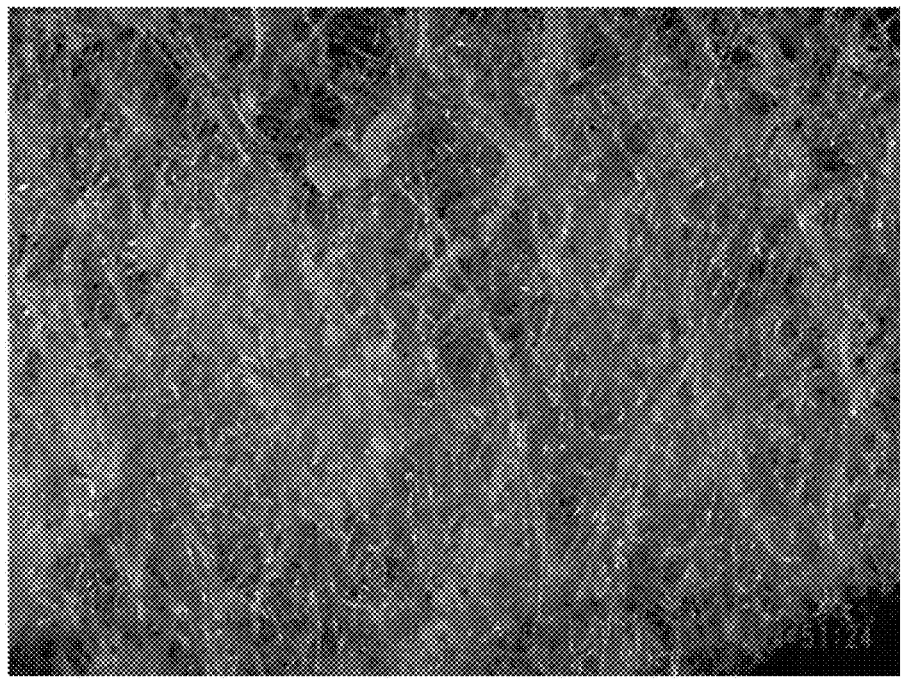
Figure 31:
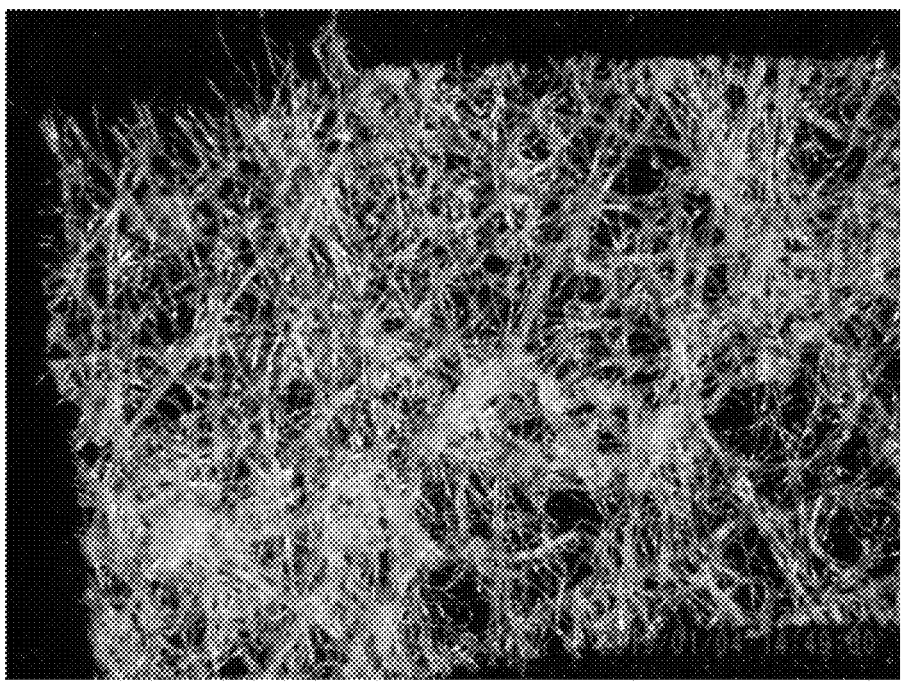
Figure 32:
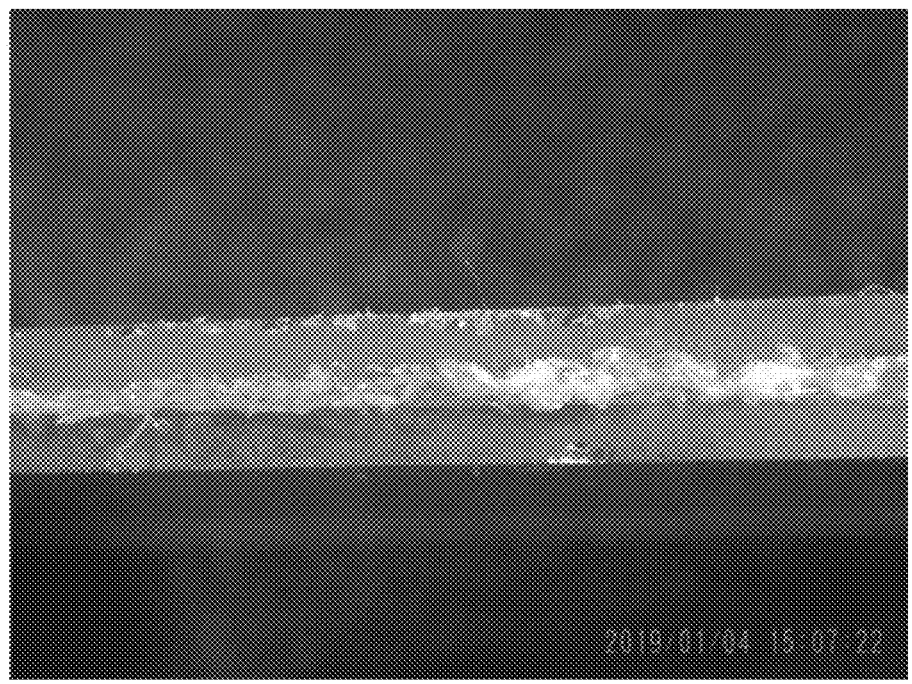
Figure 33:
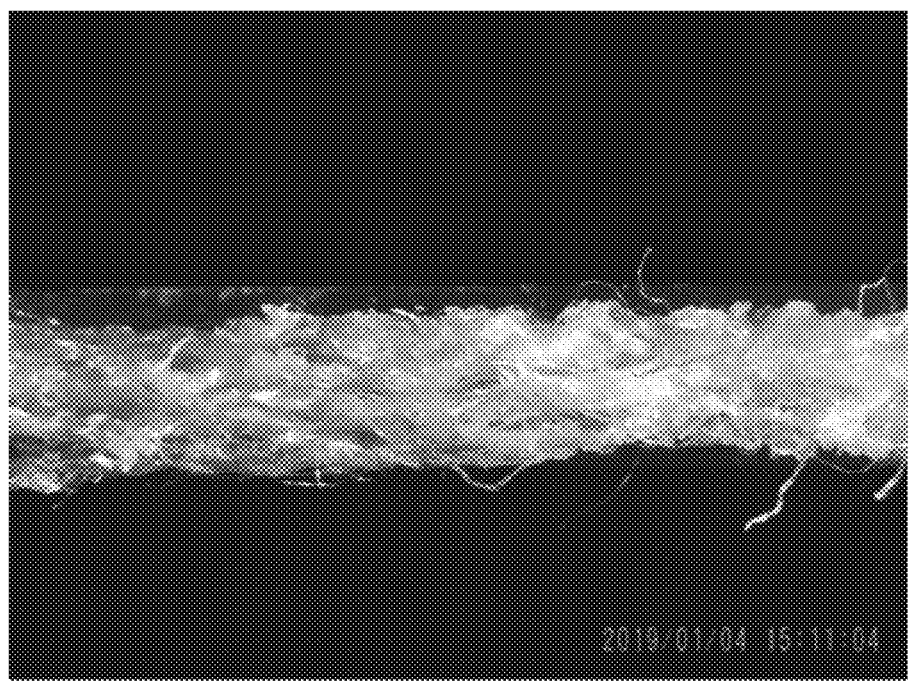

Referring to FIG. 25, the edges of the segment layers can be clamped or bonded together with a plastic ring or silicone over molding to form the sediment filter. As shown, the sediment filter can be much denser at the edges while the center bulges outward at the top, bottom or both the top and bottom.

Referring to FIGS. 29-33 the media filter segment layer AAA is shown in more detail with a multiple layer surface view, single layer surface view and a profile view. Each profile view is a from the side with the filter media sandwiched between glass slides for illustration purposes only. Segment layer AAA is formed from multiple layers of PP that are bonded together. In one embodiment, four individual layers make up one segment layer AAA which is 100% PP with a density of 20-70 grams per square meter (GSM).

Referring to FIGS. 26-28 and 45, the segment layers AA, A, B and C are illustrated by surface, cut-away, full stack profile and single layer profile views. The term full stack profile refers to the combinational of individual layers that make up the segment layer and single layer profile refers to an individual layer of the segment layer. The outer layers of each individual layer are formed from PP bonded to an inner layer formed from polyethylene terephthalate (PET) fibers. The outer PP layers dictate the range of pore sizes while the PET fibers provide a three-dimensional matrix of filter media with much less resistance to particle flow than the PP surface or outer layers. The PET fiber matrix allows sediment particles to travel in varying directions through the filter media as well as laterally. This provides a higher volume of particle loading in comparison to a filter with a more single directional flow through the filter media. The PET and PP fibers are bonded together to form each layer.

The segment layers have different compositions with decreasing pore sizes and sediment particle storage capacity. For example, in one embodiment segment layer AA includes a composition of 75% PET/25% PP, segment layer A includes a composition of 55% PET/45% PP, segment layer B includes a composition of 45% PET/55% PP, and segment layer C includes a composition of 25% PET/75% PP. Each segment layer AA, A, B and C may have a density of about 70 GSM.

Each of the segment layers AA, A, B and C can be composed of three or more layers of individual sandwich structures of PP layers on each side of PET fibers. The outer PP layers exhibit randomly distributed pore size structure across the surface of a sheet which also is a micro three-dimensional structure. This helps maintain flow rate and prevent pressure drop. The inner PET layer is composed of fibers which create a further three-dimensional structure to allow better dust loading capacity whilst maintaining randomly distributed pore sizes which again helps prevent pressure drop and premature clogging. The PET layer generally has a lower density and has much more porosity than the PP layer.

Multiple layers of the sandwich are stacked one on top of another to create a segment with more depth and hence more voids and more of a three-dimensional structure. These randomly distributed voids help to capture a range of particle sizes to prevent subsequent segment layers from clogging prematurely. Stacking of these layers helps create a more three-dimensional structure with multidirectional flow.

Segment layer AA is made from PET fibers sandwiched between layers of PP. This "sandwich" is more open than subsequent segment layers and exhibits a larger pore size structure in general than subsequent segment layers but has a smaller pore size than previous segment layers.

In one embodiment, segment layer AA can be composed of three or more individual sandwich structures. The outer layers of each sandwich are composed of melt blown polypropylene which exhibits randomly distributed pore size structure across the surface of a sheet which is which also a micro three-dimensional structure. This helps maintain flow rate and prevent pressure drop. The inner layer is composed of polyethylene terephthalate fibers which create a further three-dimensional structure to allow better dust loading capacity whilst maintaining randomly distributed pore sizes which again helps prevent pressure drop and premature clogging.

Multiple layers of the sandwich are stacked one on top of another to create a segment with more depth and hence more voids and more of a three-dimensional structure. These randomly distributed voids help to capture particle sizes to prevent subsequent segment layers from clogging prematurely. Stacking of these layers helps create a more three-dimensional structure with multidirectional flow.

Figure 34:
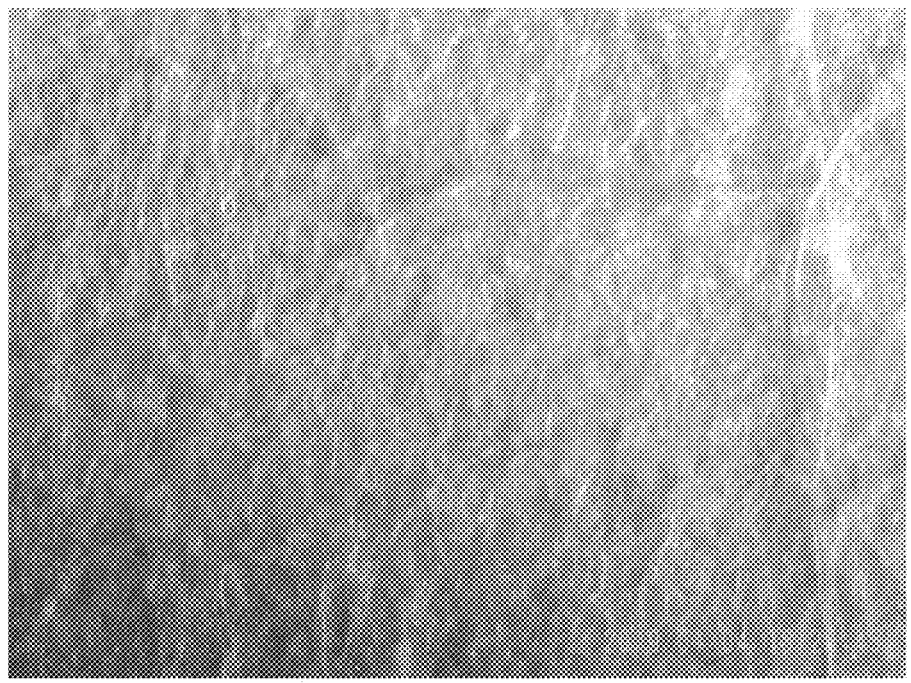
FIGS. 34-36 show surface, profile and stack profile views of segment layer D.
Figure 35:
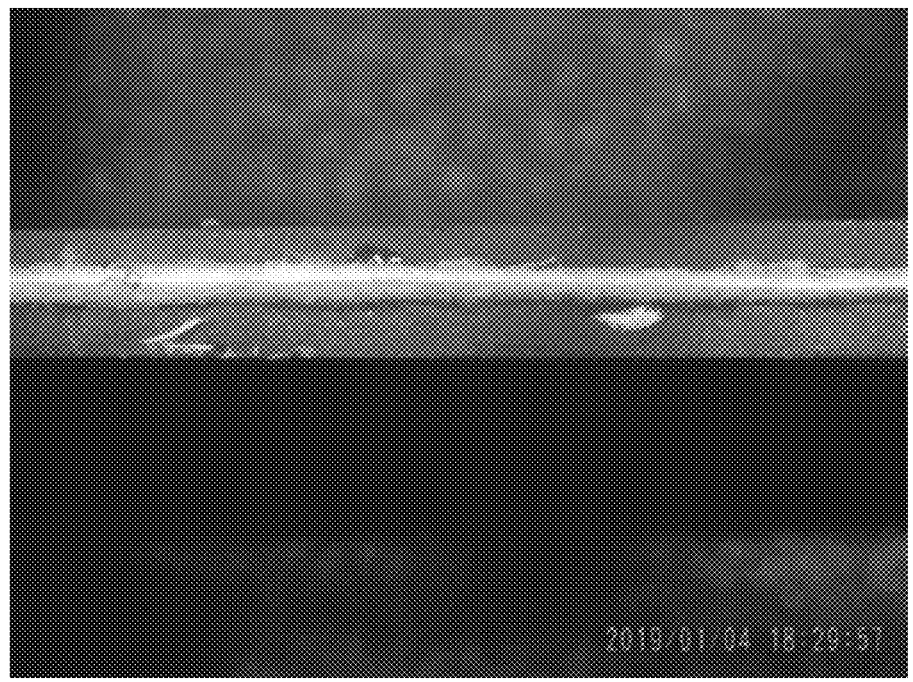
Figure 36:
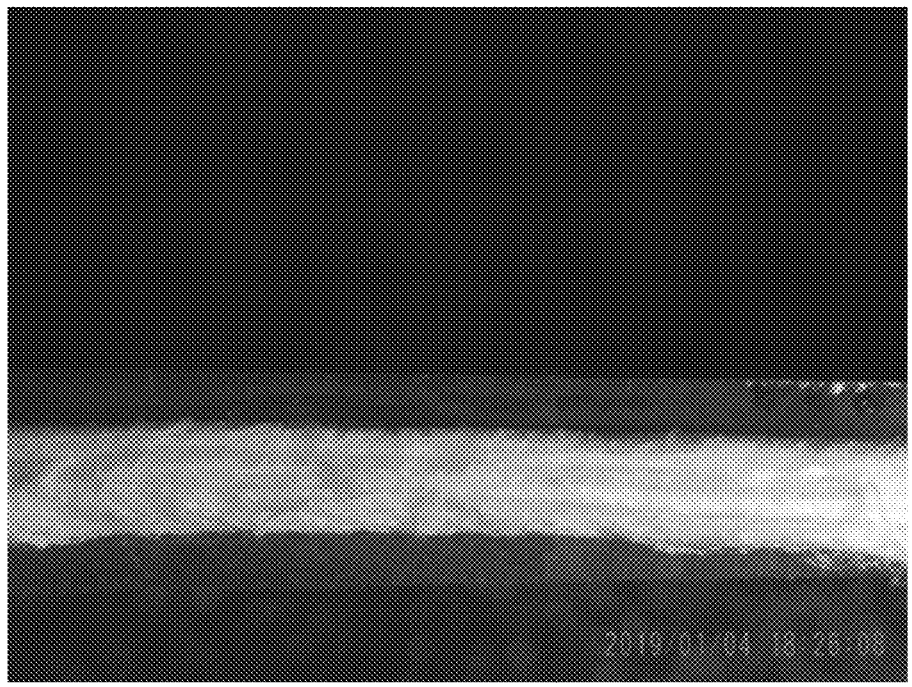

Referring to FIGS. 34-36, segment layer D is illustrated by in profile, stack profile and surface views. In one embodiment, segment layer D has all PP individual sheets with a density of about 40 GSM that are bonded together into segment layer D. The PP sheet may have a depth of 0.5-2 mm Multiple individual sheets are stacked to create a segment with depth and voids. These randomly distributed voids help to capture larger particle sizes above 3 microns to prevent the subsequent layers from clogging prematurely and causing a drop in pressure. This stacking helps creates a more three-dimensional filter segment with greater dust holding capacity and with multidirectional flow.

Figure 37:
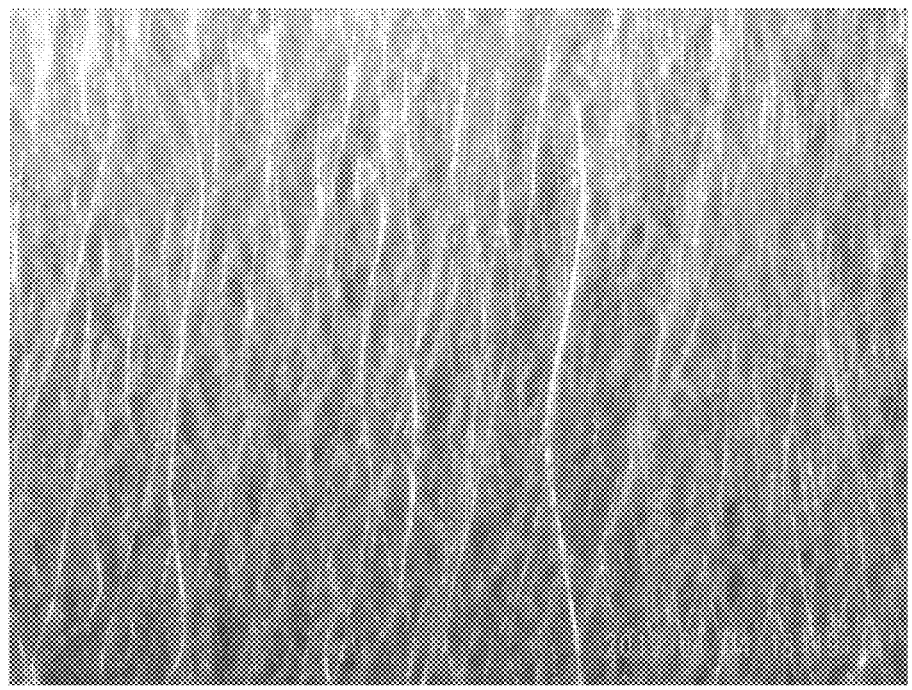
FIGS. 37-39 show surface, profile and stack profile views of segment layer E.
Figure 38:
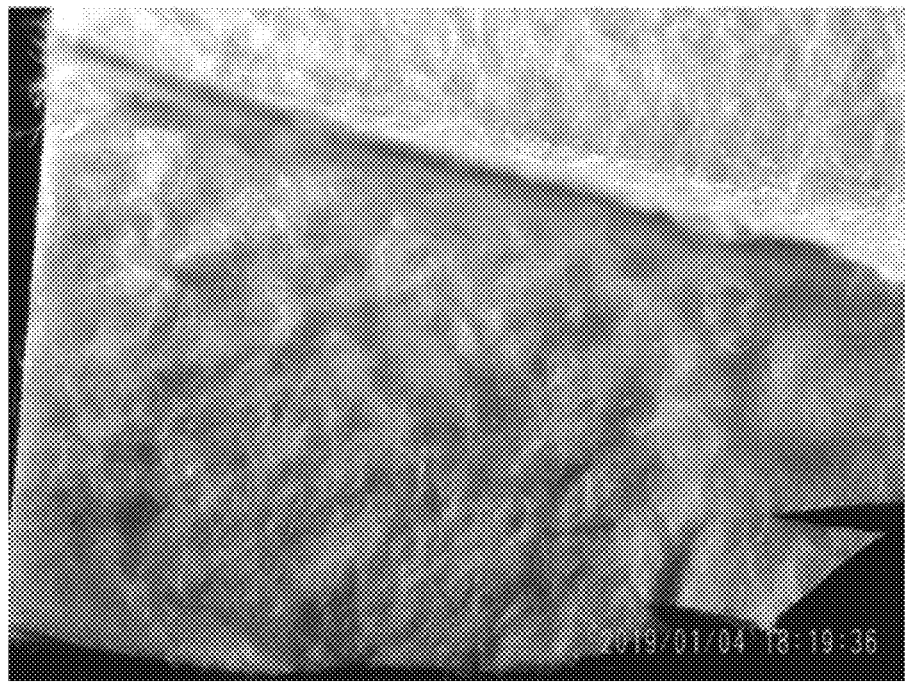
Figure 39:

Referring to FIGS. 37-39, segment layer E is shown in surface, cut away and profile views. Segment layer E includes PP on outer surfaces with pseudoboehmite sandwiched in-between. Pseudoboehmite is an aluminum compound with the chemical composition AlO. It consists of finely crystalline boehmite, but with a higher water content than in boehmite.

Segment layer E can be composed of one or more layers of individual sandwich structures with a 6.25 mean micron pore size. The pseudoboehmite creates a further three-dimensional structure to allow better dust loading capacity whilst maintaining randomly distributed micro pore sizes which again helps prevent pressure drop and premature clogging. This helps maintain flow rate and prevent pressure drop with multidirectional flow. Powder activated carbon may also be incorporated in the inside of the sandwich for taste, odor contaminant reduction.

Figure 40:
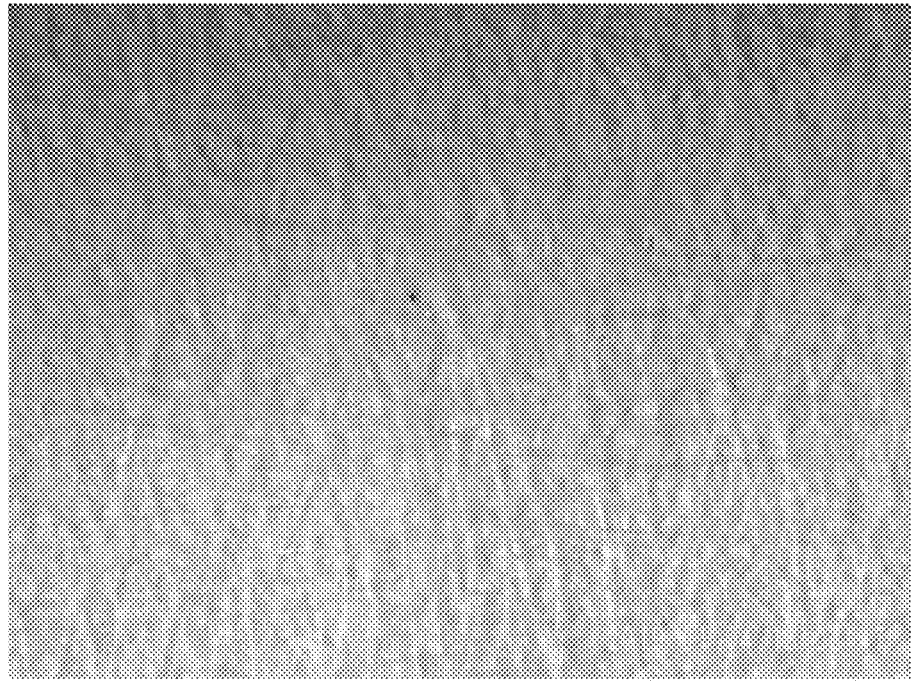
FIGS. 40-42 show surface, profile and stack profile views of segment layer F.
Figure 41:
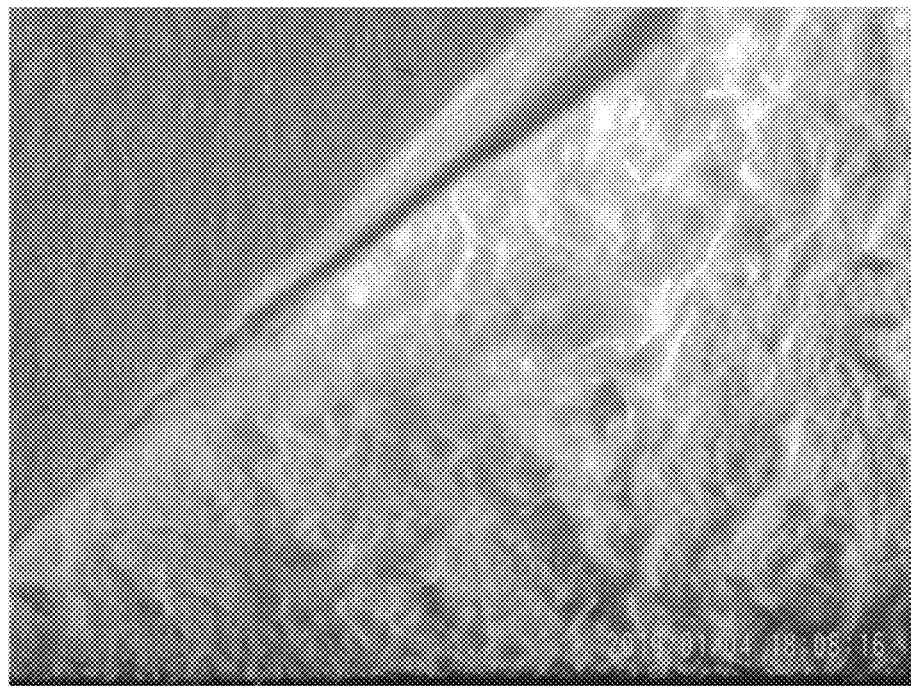
Figure 42:

Referring to FIGS. 40-42, segment layer F is shown in surface, cut away and profile views. Like segment layer E, segment layer F can be composed of includes PP on outer surfaces with pseudoboehmite sandwiched in-between, however, the individual sandwich structures have a much finer 1.25 micron mean pore size.

Other filter media may be used instead of pseudoboehmite, such as, for example, very fine (small diameter), highly entangled and/or dense layers of PET fibers.

Figure 43:
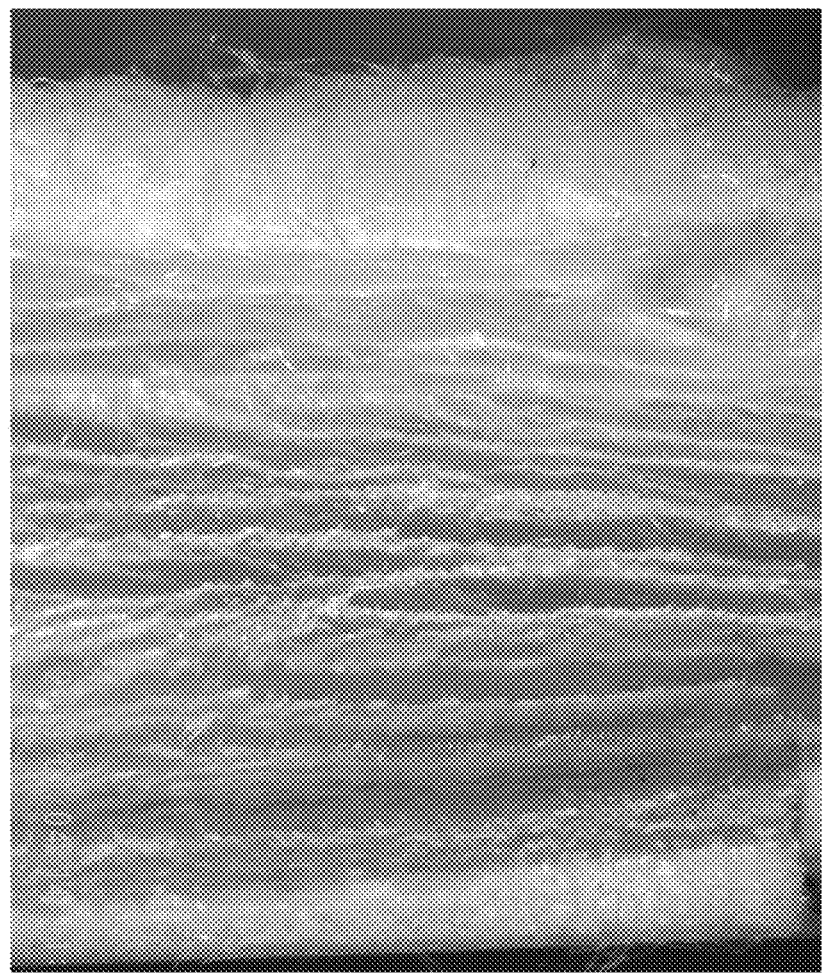
FIGS. 43 and 44 show full stack profiles of segment layers AAA, AA, A, B, C, D, E and F with one bottom exit and two bottom exits, respectively.
Figure 44:
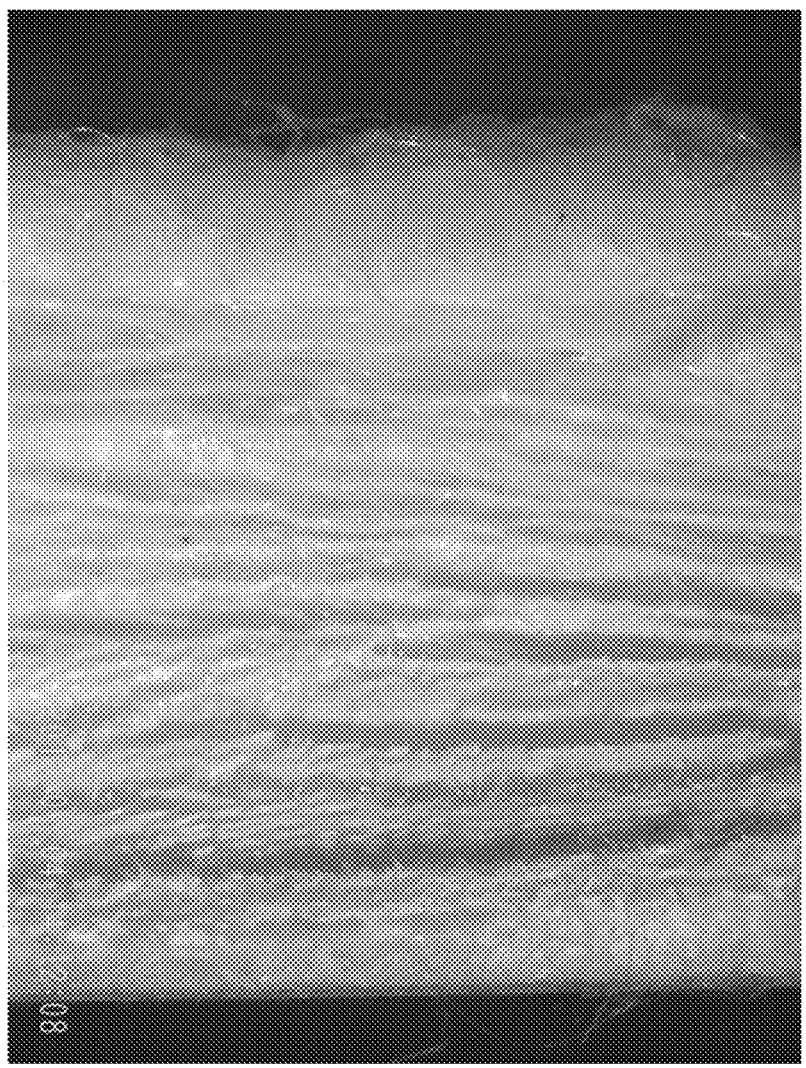
Figure 45:
FIG. 45 shows a single layer profile view of one of segment layers AA, A, B, C or D.

FIGS. 43 and 44 are photos of the full stack of segment layers AAA, AA, A, B, C, D and F shown in FIGS. 21-23 mentioned above. All the segment layers are in contact with adjacent layers. The resulting sediment filter has can have a finer pore size and/or higher dust load capacity relative to conventional filters before the sediment filter gets clogged and loses its filtration capacity.

Figure 46:
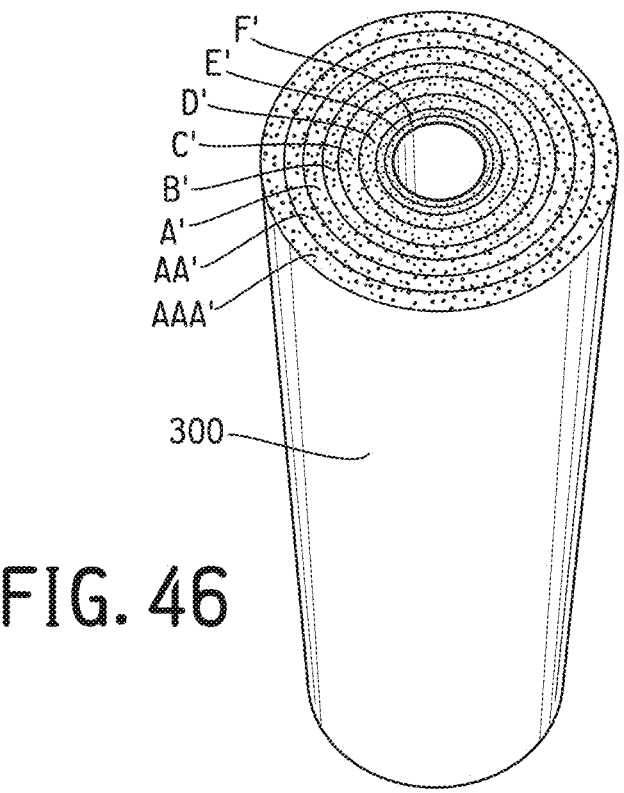
FIGS. 46-48 show another embodiment of a filter of the present invention as a cylindrical filter.
Figure 47:
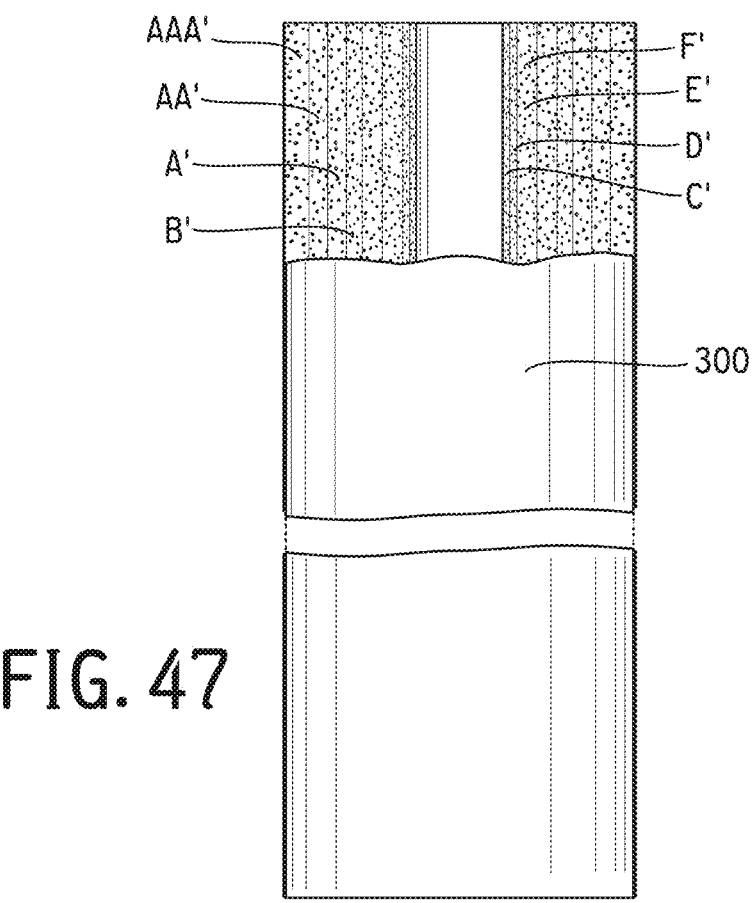

Referring to FIGS. 46 and 47, a cylindrical sediment filter 300 is illustrated with filter media segment layers AAA', AA', A', B', C', D', E' and F' are configured as a concentric ring. Each segment AAA', AA', A', B', C', D', E' and F' are in contact with adjacent segment layers but the surfaces of adjacent segment layers are not bonded together. The composition of the segment layer may be like that described above with respect to FIGS. 21-23 and 43-44. In other embodiments, there may be more or less segment layers of different compositions.

Figure 48:
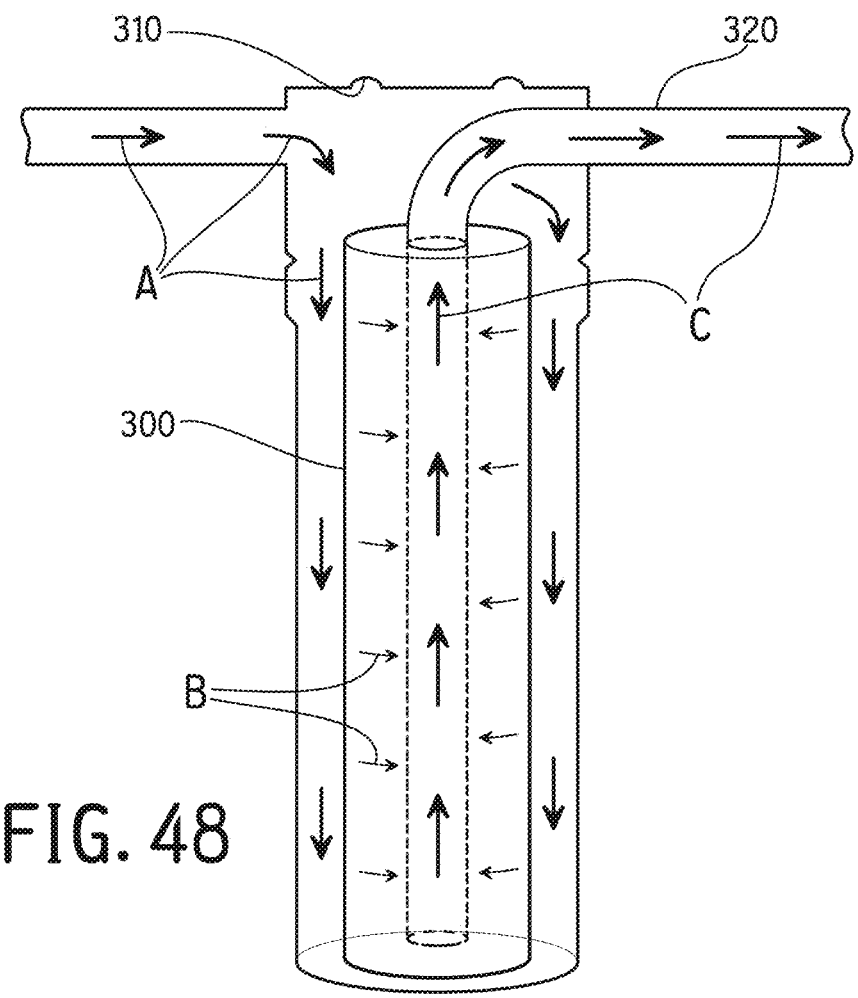

FIG. 48 illustrates the cylindrical sediment filter 300 in use. The cylindrical sediment filter 300 is installed in a filter casing 310. The filter casing has a water input line with water flowing into the filter casing shown by Arrow A.

The bottom of the filter 300 is sealed or pressure fitted against the bottom of the casing such that water flows through the filter as shown by Arrow B. The water flows into an open channel at the center of the filter 300 and flows out of the casing case through output line 330 in the direction shown by Arrow C.

Figure 49:
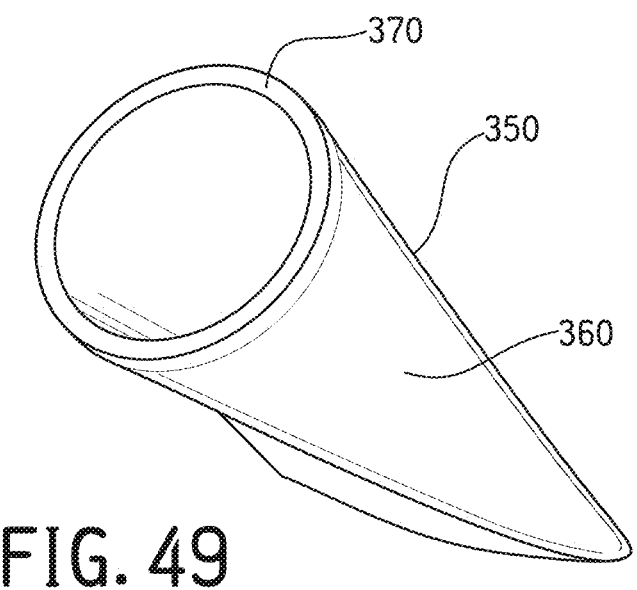
FIG. 49 is another embodiment of a filter of the present invention as a bag filter.
Figure 50:
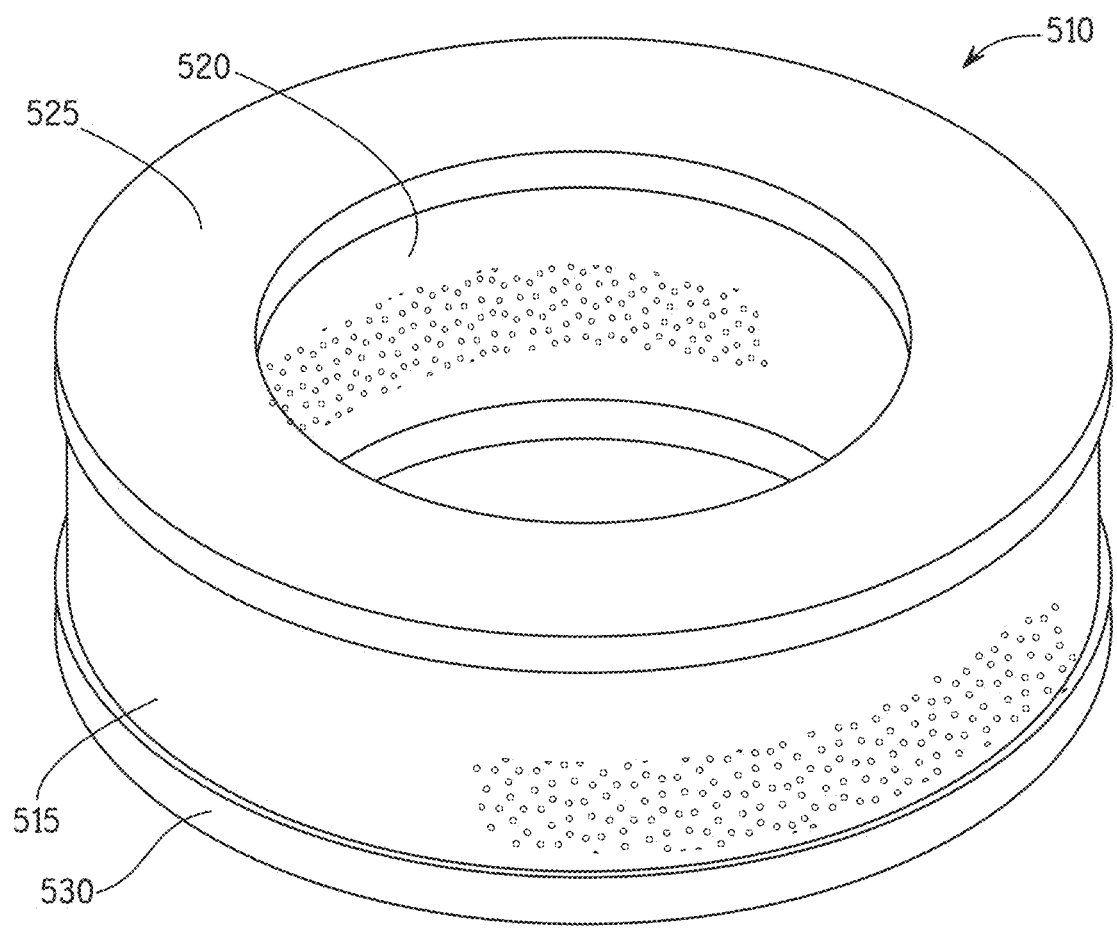
FIGS. 50-54 illustrate another embodiment of an annular ring filter.
Figure 51:
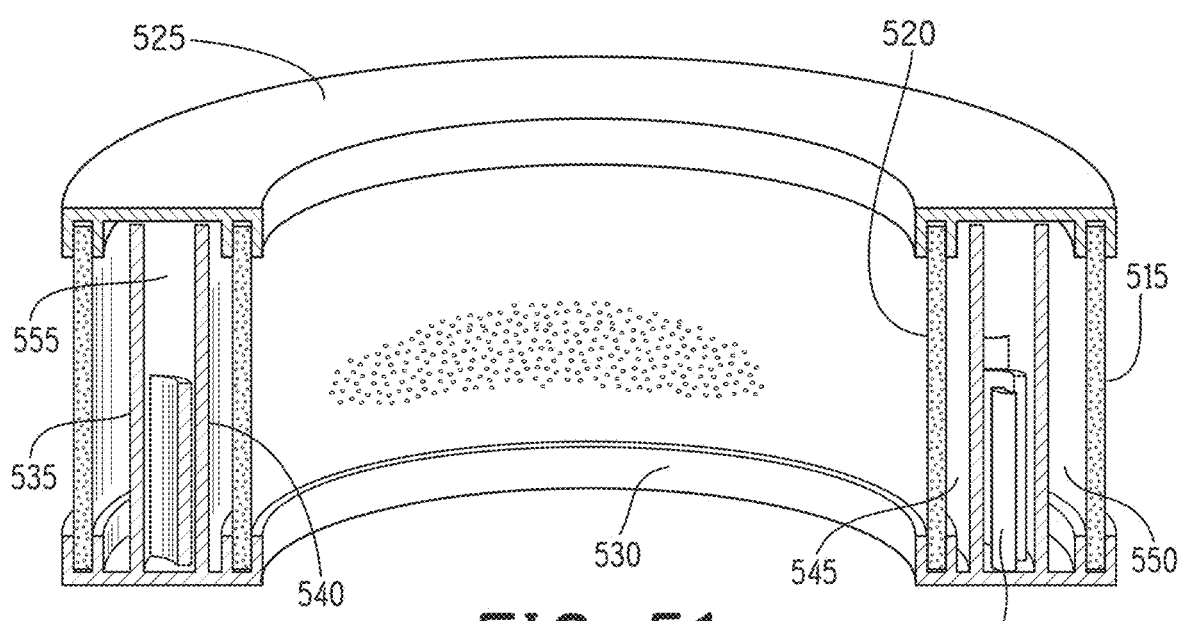
Figure 52:
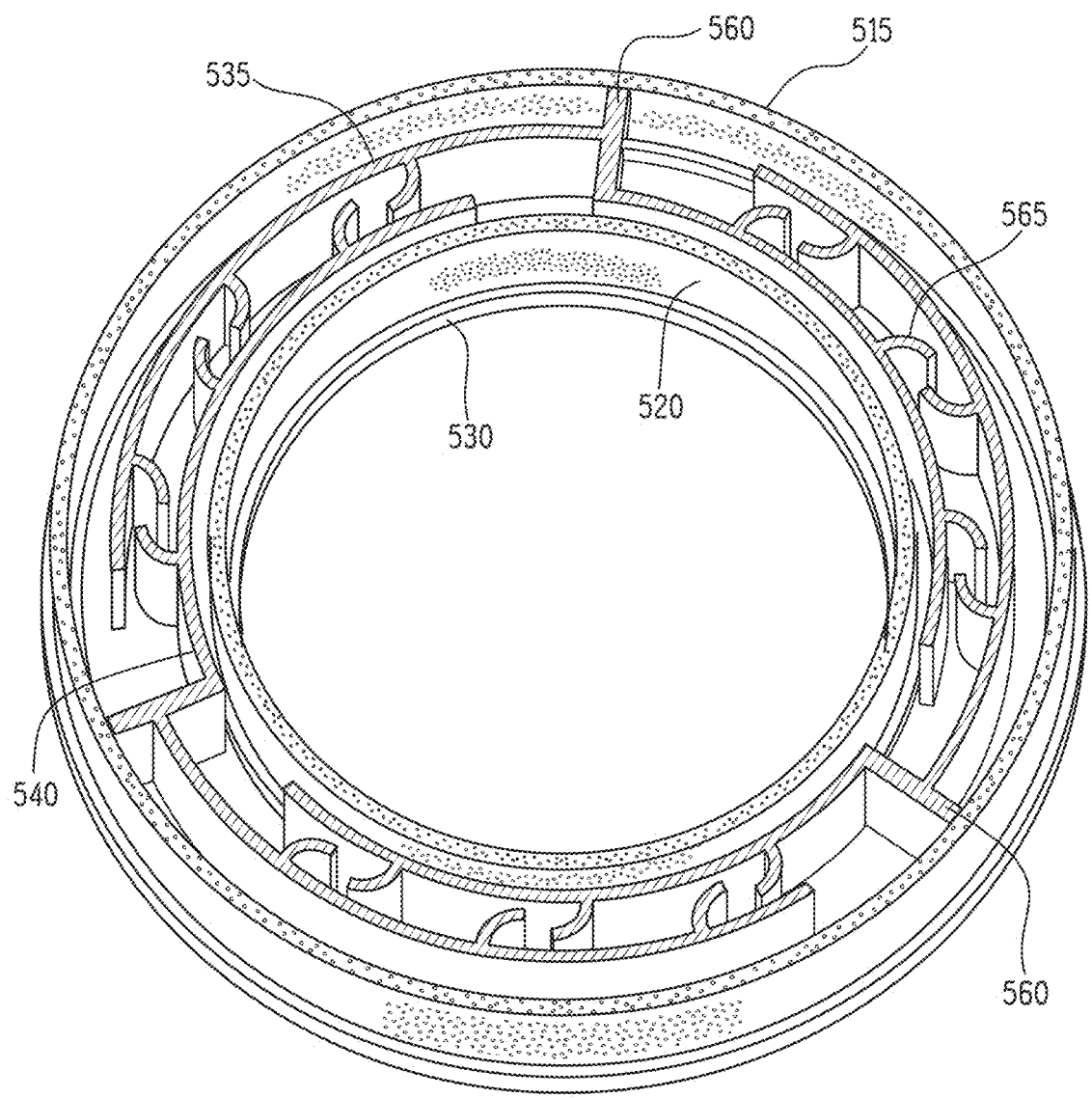
Figure 53:
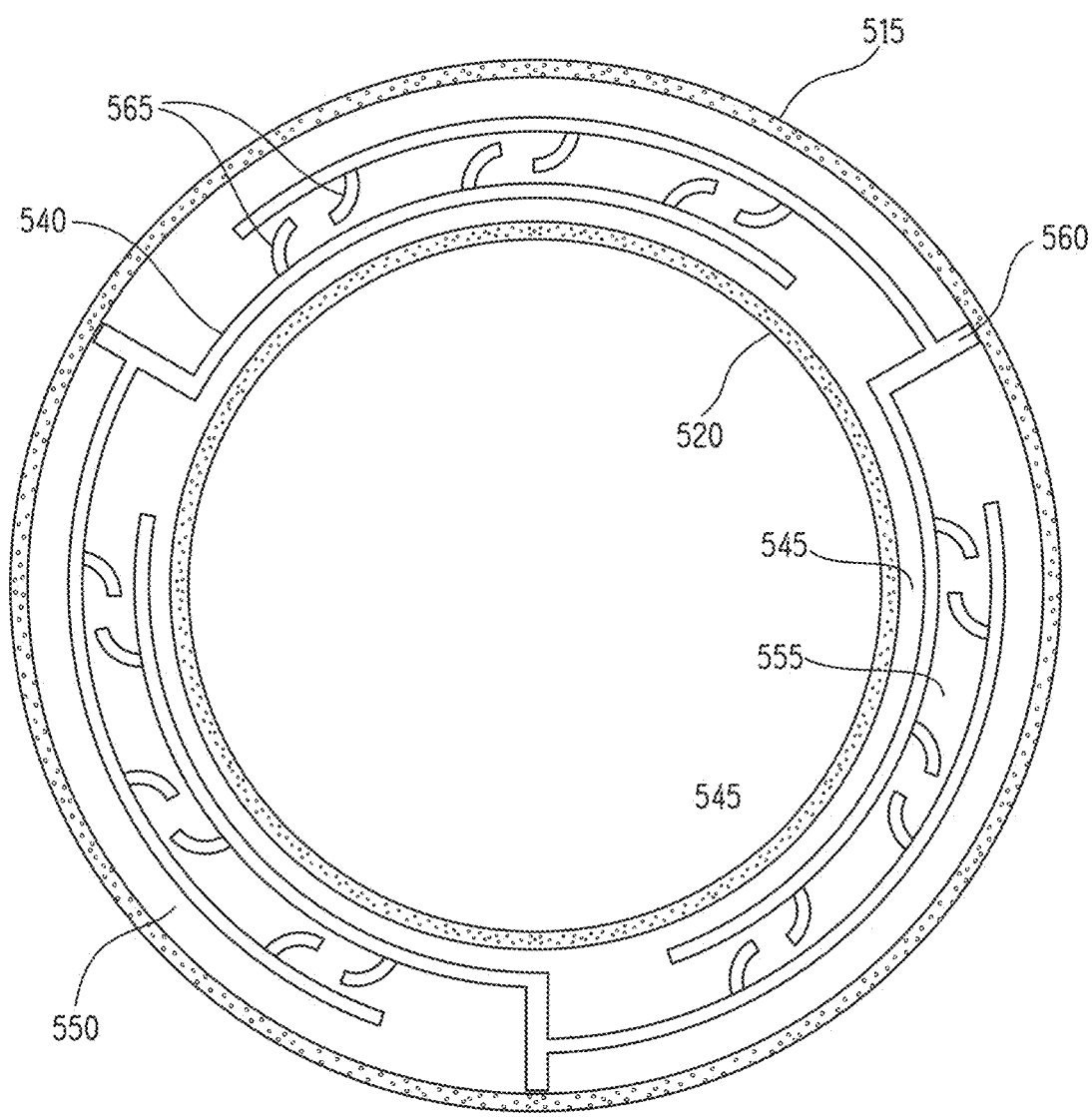
Figure 54:
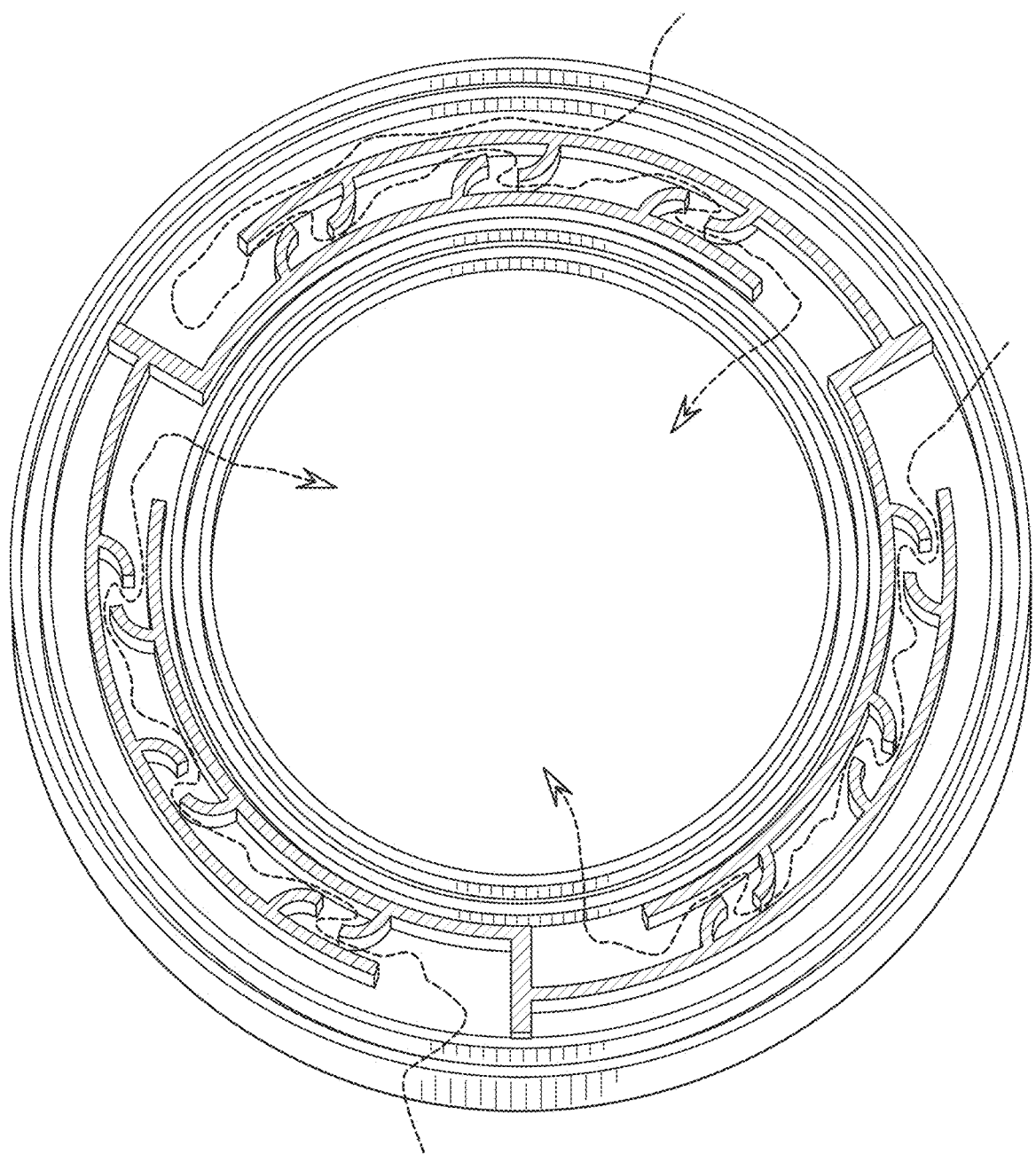

FIG. 49 illustrates another embodiment of a sediment filter configured as a bag filter 350. The bag filter 350 includes multiple segment layers as that described above or may have another configuration of segment layers. The edges of the bag filter 350 may essentially be crimped or secured together by a round collar or may be heat bonded or glued together.

Referring to FIGS. 50-54, in another embodiment the carbon ring 160 is replaced by an annular ring filter 510 that includes adsorption particles, such as, activated carbon granules or ion exchange resin media, in a casing or enclosure. The filter 510 includes a first circular wall 515 and a second circular wall 520 mounted between a first annulus wall 525 and a second annulus wall 530. The internal volume of the annular ring filter 510 is filled with activated carbon granules and/or ion exchange resin. The first and second circular walls 515, 520 are permeable to water but retain the granules or beads. Mesh or screen may also be used to confine the filter media to various portions of the filter.

A first dividing wall 535 and a second dividing wall 540 is mounted between the first and second circular wall 515, 520 to divide the internal volume into first, second and third channels 545, 550, 555. A bisecting or termination wall 560 is attached between the first and second circular walls to the dividing walls to change the direct of water flow from a first direction in the first channel to a second direction in the second channel and to a third direction in a third channel.

Protrusion walls (turbulators) 565 are mounted in the second channel with the turbulators partially obstructing the second channel thereby increasing turbulent water flow in the second channel. The turbulators include mating pairs of curling walls configured to cause a z-shaped or s-shaped water flow within the second channel Each protrusion wall 565 is mounted to the dividing walls 535, 540. Alternatively, the turbulators 565 can be mounted to the annulus walls at a position in the second channel 555.

Water flows from the outside to the inside of the annular ring filter 510. The water enters the filter through the outer circular wall 515. The water flows in a first channel 550 until it reaches the end of the dividing wall 535 where it enters the second channel 555. The second channel 555 is filled with the protruding walls 565 that partially obstruct or change direction of water flow in the second channel 555. The resulting circuitous path results in more contact with the activated carbon granules.

The water flows through the second channel 555 until it reaches the end of second dividing wall 540. The water is then in contact with the permeable inside filter wall 520. As such, the water flows the permeable filter wall 520 to exits the annular filter ring 510 into the center of the ring. Some of the water also flows into the third channel 545 until it also exits through the permeable inside filter wall 520. The water may then enter other filters that are part of a concentric ring inside the annular ring filter 510.

Figure 55:
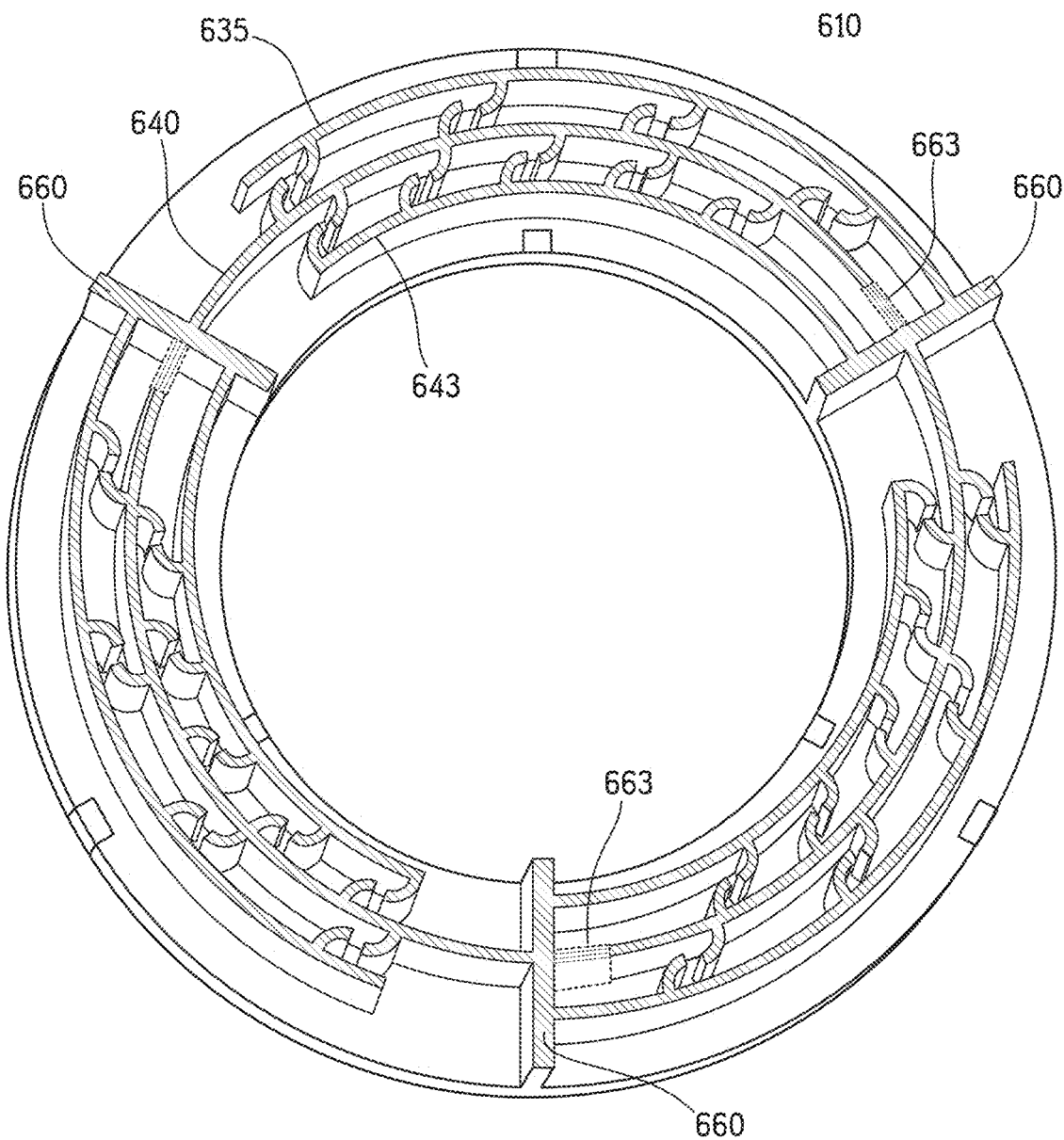
FIGS. 55, 56a, 56b illustrate a further embodiment of an annular ring filter with three dividing walls.
Figure 56A:
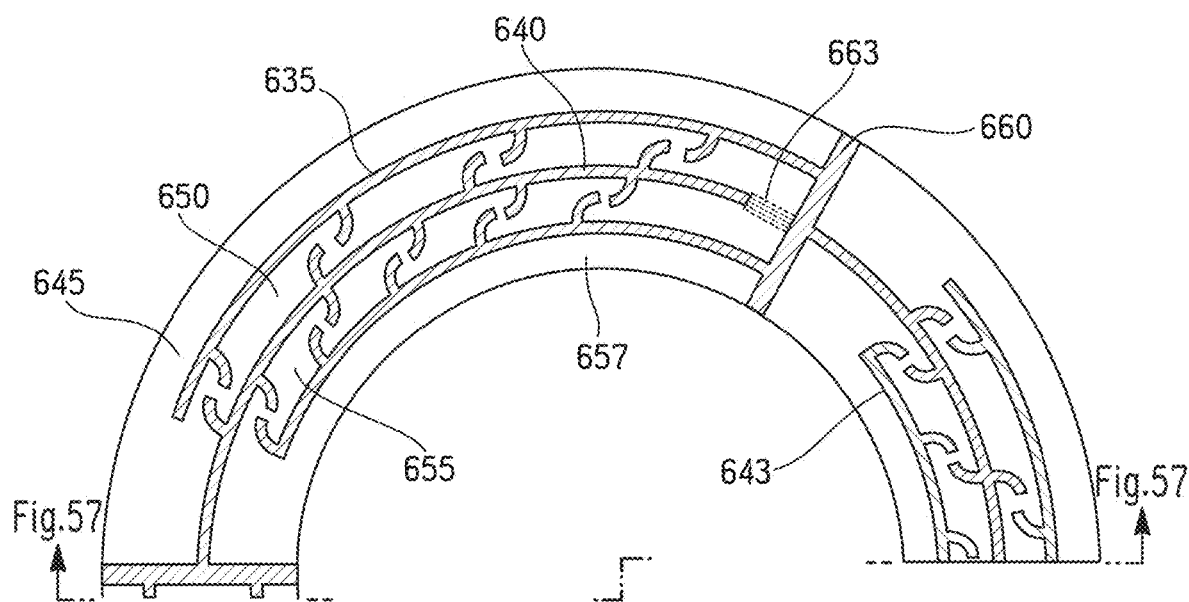
Figure 56B:
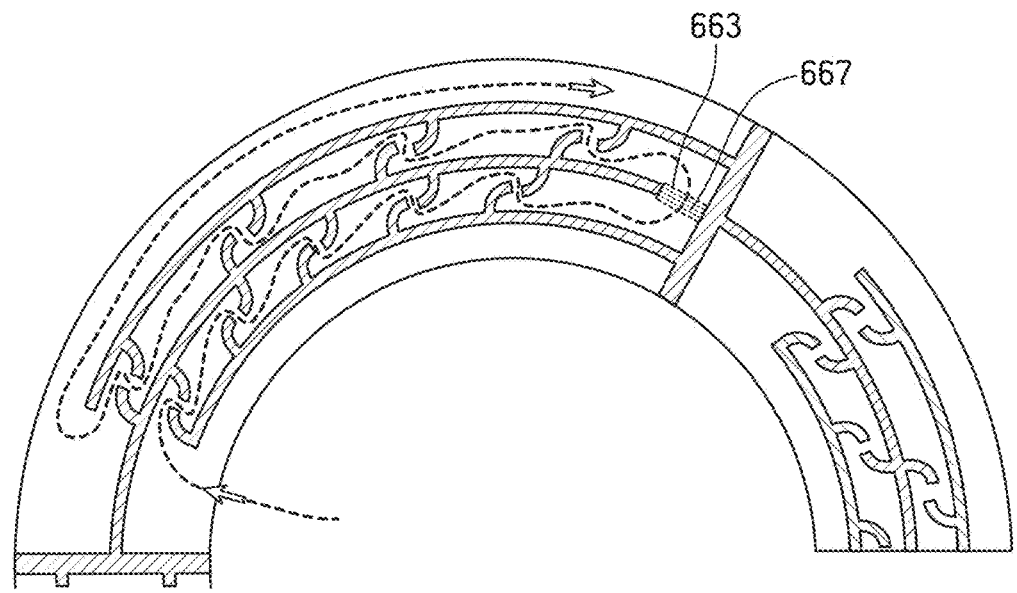

Referring to FIGS. 55, 56a and 56b, another embodiment of the annular ring filter 610 includes adsorption particles, such as, activated carbon granules, ion exchange resin or other filter material, in the casing or enclosure. In this embodiment of the annular ring filter 610, some of the outer components have been omitted for ease of reference to internal details. The omitted components include first and second circular wall 515, 520 mounted between first and second annulus walls 525, 530 shown above with respect to FIGS. 51-53 above.

First, second and third dividing walls 635, 640, 643 are mounted between the first and second circular walls 515, 520 (not shown) to divide the internal volume into first, second, third and fourth channels 645, 650, 655, 657. Bisecting or termination walls 660 intersect the dividing walls 635, 640, 643 to change the direct of water flow from a first, to a second, to a third and then a fourth direction on the outside of or between the dividing walls 635, 640, 643. An opening 663 in the second dividing wall 640 fluidly connects the second and third channels 640, 655.

Referring to FIG. 56b, a screen or mesh 667 may be positioned in the opening 663. The screen 667 holds filter particulate matter in the channel.

Protrusion walls (also referred to as turbulators) 665 are mounted in the inner channels, which are the second and third channels 650, 655. The turbulators partially obstruct the channel 650, 655 thereby increasing turbulent water flow in the second channel. The turbulators include mating pairs of curling walls configured to cause a z-shaped or s-shaped water flow within the second channel Each protrusion wall or turbulator 665 may be mounted to the dividing walls 635, 640, 643. Alternatively, the turbulators 665 can be mounted to the annulus walls (not shown) at a position in the inner channels 650, 655. The turbulators 665 cause a turbulent fluid flow through the second and third channels to mitigate "tunneling" of fluid through the granular filter media.

The inner channels 650, 655 are filled with the various filter media. For example, the second channel 650 may be filled with carbon granules (see FIG. 62) and the third channel 655 may be filled with ion exchange resin (see FIG. 63) that are contained by mesh screens (see FIG. 64). Other types of filter media may be used.

Figure 57:
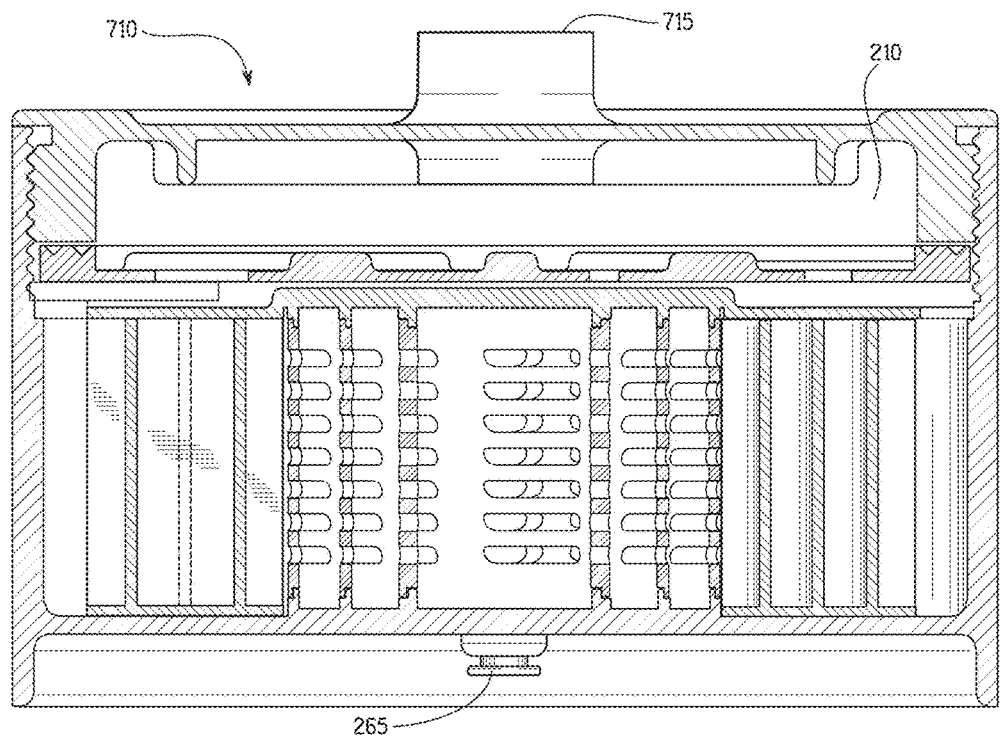
FIGS. 57-61 illustrate other embodiments of a filter in a housing.

FIG. 57 is another embodiment of the filter assembly 710 that can be installed in an inline filter system. A water inlet 715 allows water to enter the sediment filter chamber 210. The water then travels through the filter assembly 710 to the exit port 265 as shown above with respect to FIG. 11.

Figure 58:
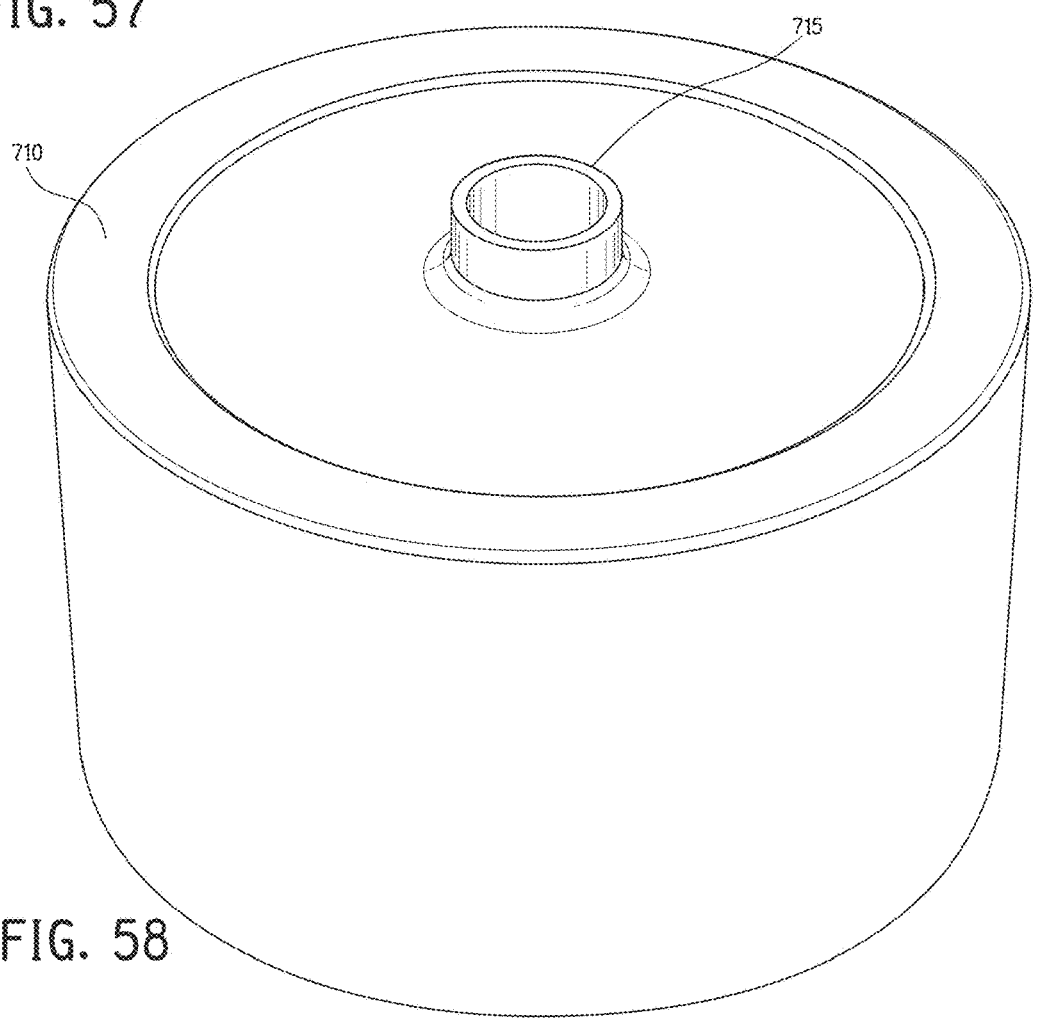
Figure 59:
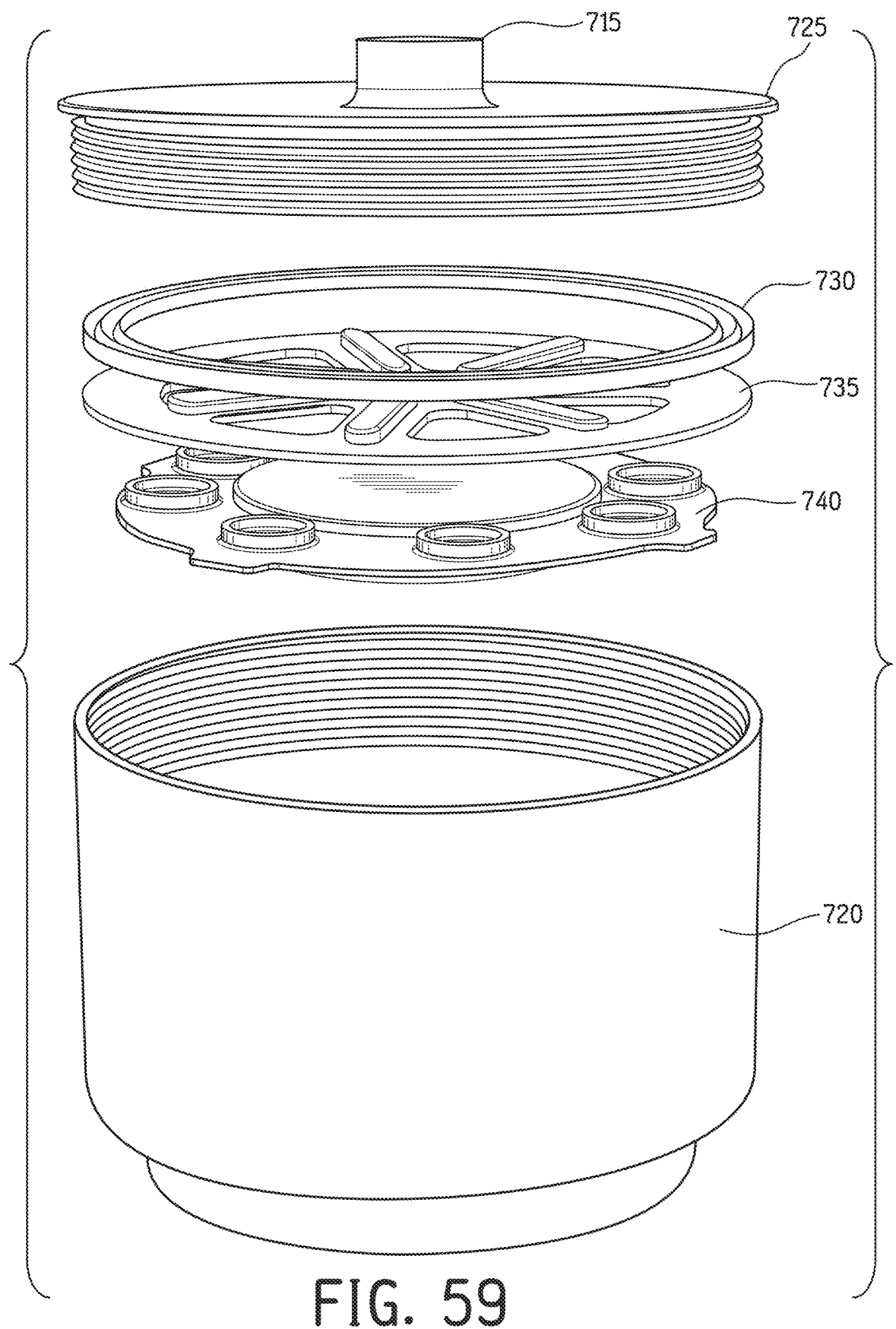

FIG. 58 show a perspective view of the filter assembly 710 of FIG. 57 and FIGS. 58 and 59 show exploded views of portions of the filter assembly 710. The filter assembly 710 includes a housing 720 and a threaded cover 725 that is received within a threaded portion of the housing 720.

An upper ring 730 is positioned in the cover 725 above the sediment filter (not shown) along with an upper spacer 735. The upper spacer 735 has lift bars and wedge-shaped cut-outs to allow water to flow through the spacer 735 with a more efficient flow into the sediment filter. A lower spacer 740 has protrusions that can thread into the housing 720 and include circular cut-outs for fluid flow from the sediment filter chamber to the next stage of the filter.

Figure 60:
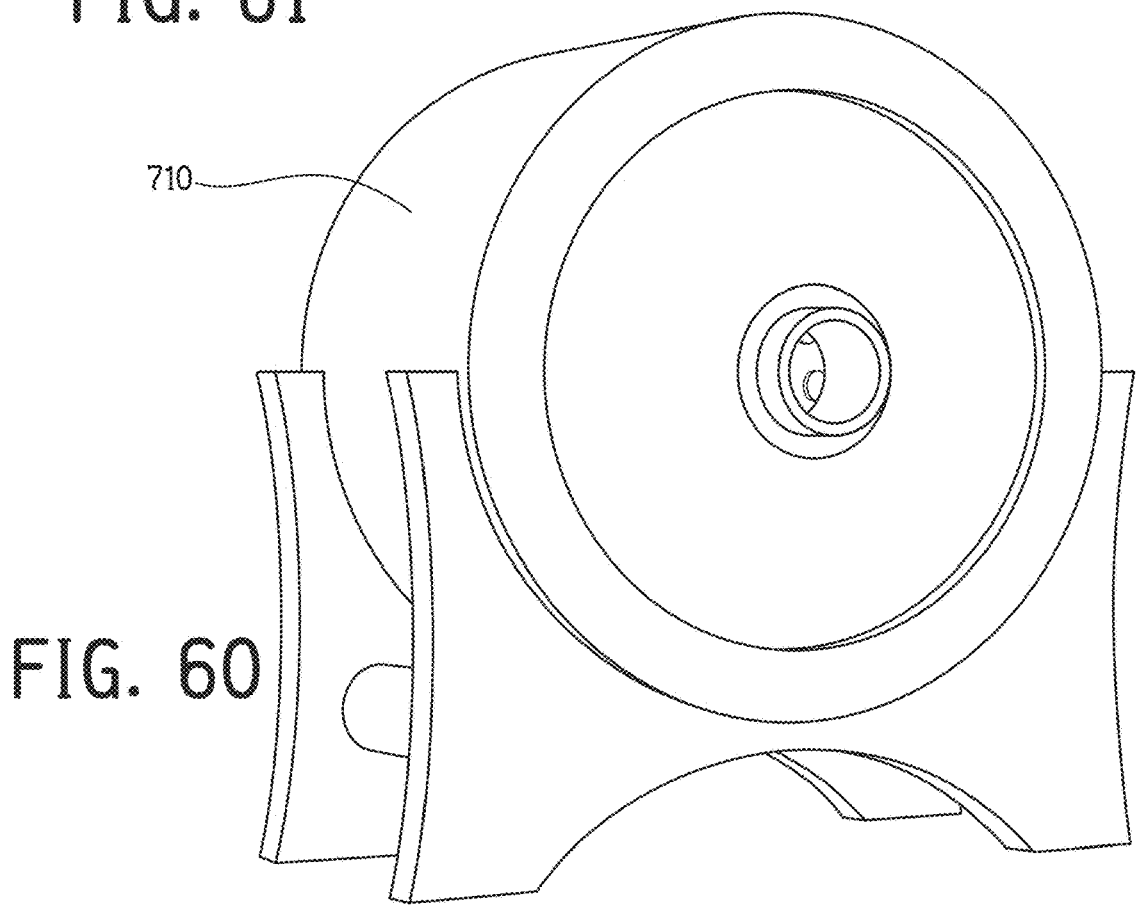

FIG. 60 shows the filter assembly positioned on a stand 745 that could be positioned on a countertop.

Figure 61:
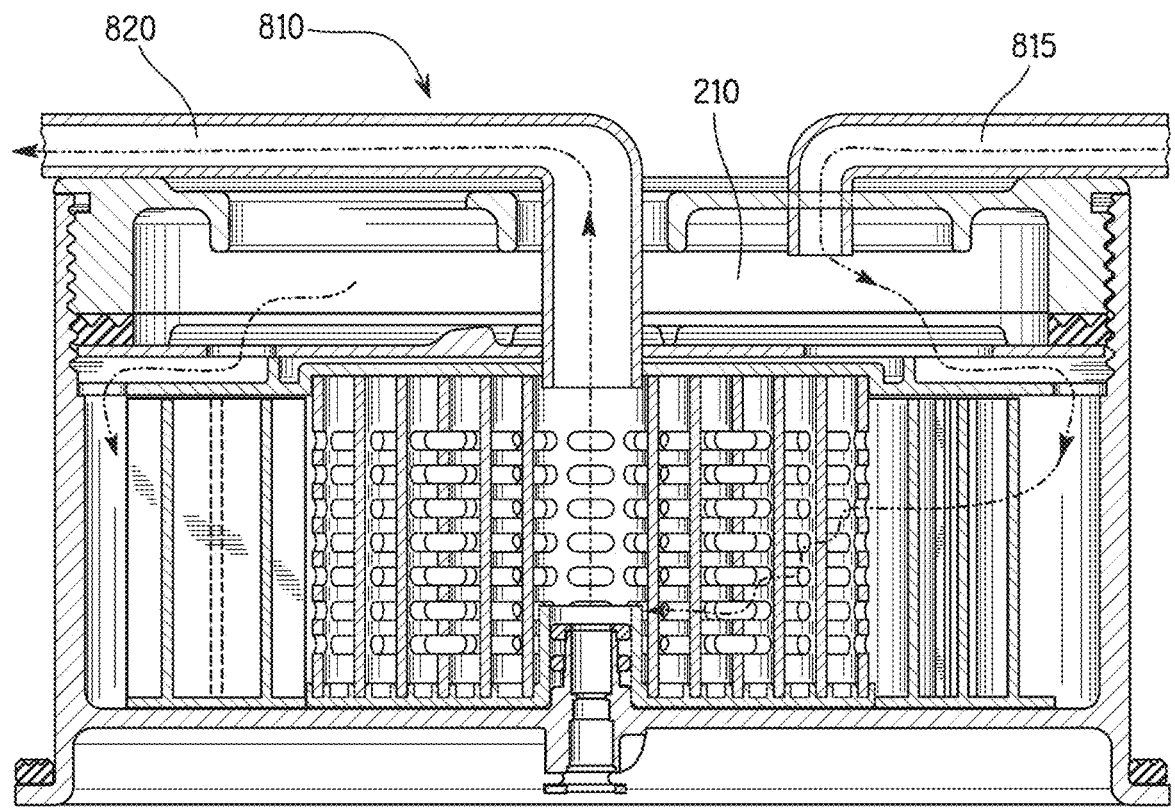

FIG. 61 shows another embodiment of the filter assembly 810. The filter assembly 810 has an input tube 815 that shuttles water into the sediment filter chamber. An output tube 820 receives water from the inner most portion of the cylindrical filter to direct the filtered water out of the filter assembly.

Figure 62:
FIGS. 62-64 illustrate various filter media and a mesh screen.
Figure 63:
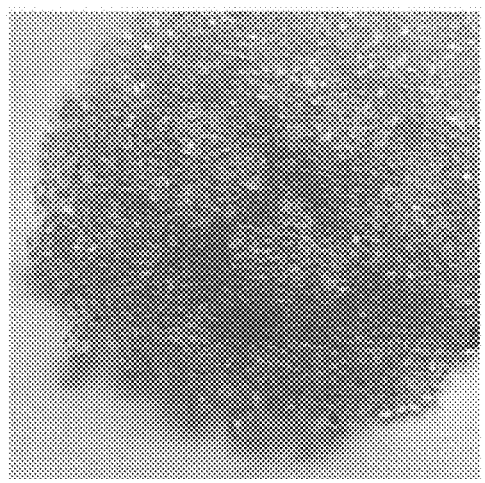
Figure 64:
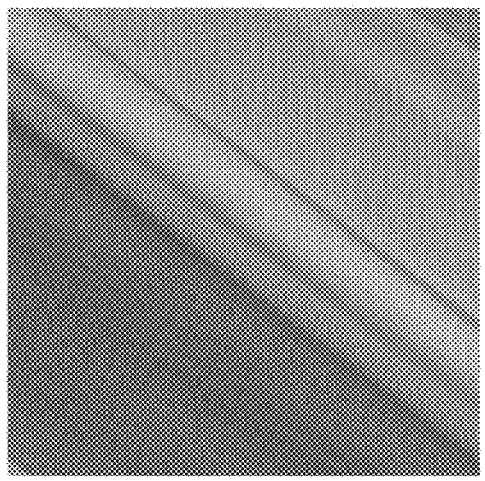

FIGS. 62-63 illustrate various types of filter media and FIG. 64 shows a mesh screen used to confine the filter media to portions of the filter. Different types of filter media may be used. For example, the filter media may be granular particles of activated carbon or activated alumina.

Figure 65:
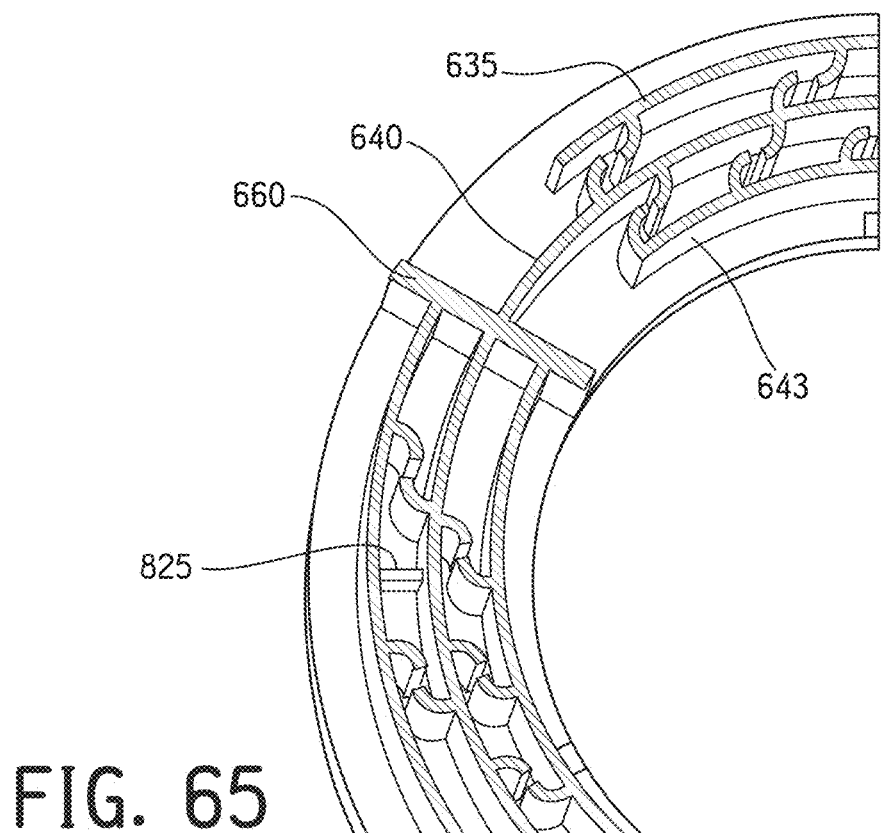
FIGS. 65-66 illustrate a partially raised wall that prevents channeling or tunneling of the filter media.
Figure 66:
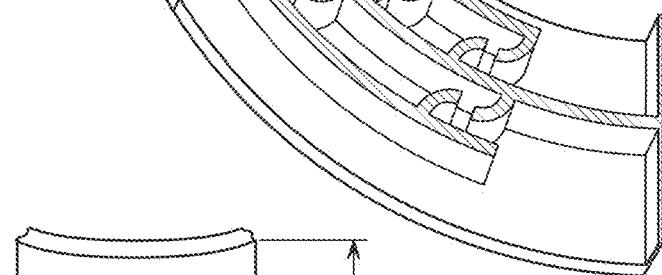

FIG. 65 illustrates a partially raised wall 825 that prevents channeling or tunneling of the filter media. As shown in FIG. 66, the partial raised wall 825 may have a height of about 2.5 cm while the channel height may be about 8 cm. The partial raised walls 825 may be positioned around the filter at periodic intervals. The raised walls may be mounted to the top and bottom of each channel while the turbulator walls can be mounted to the left and right side of each channel.

The description above has been described with reference to particular embodiments, however, those skilled in the art will understand that various changes may be made and equivalents may be substituted without departing from the spirit and scope of the invention. In addition, many modifications may be made to adapt to a particular situation, material, composition of matter, process, process step or steps, to the objective spirit and scope of the present disclosure. For example, the filter assembly may be incorporated into another type of water vessel, such as, a drum, barrel or a fixed water system. The filter assembly may also be used for filtering air other types of fluids, including liquids and gases. The term "sediment" and "particles" may be used interchangeably since in other embodiments other types of particles, such as, for example, airborne pollutants, may be filtered. As another example, the sediment filter may have another shape, such as, a rectangle, globe or bag. All such modifications are intended to be within the scope of the claims provided below.

The invention claimed is:

1. A particle filtration system, comprising:
a first filter segment that comprises five first filters, wherein
each of the first filters includes a first fibrous layer and a first pair of surface layers sandwiching the first fibrous layer,
the first surface layers comprise a higher density than the first fibrous layer,
the first surface layers each include a first range of pore sizes, and
each of the first filters comprises a composition of 75% first fibrous layer and 25% first surface layers;
a second filter segment that includes five second filters, wherein
each of the second filters includes a second fibrous layer and a pair of second surface layers sandwiching the second fibrous layer,
the second surface layers comprise a higher density than the second fibrous layer, the second surface layers each include a second range of pore sizes, and the second range of pore sizes is smaller than but overlaps with the first range of pore sizes, and
each of the second filters comprises a composition of 55% second fibrous layer and 45% second surface layers; and
a third filter segment that comprises a plurality of third filters, wherein
each of the third filters includes a third fibrous layer having a first and second filter surface, and a pair of third surface layers sandwiching the first and second filter surface of the third fibrous layer,
the third surface layers comprise a higher density than the third fibrous layer, the third surface layers each include a third range of pore sizes, and the third range of pore sizes is smaller than but overlaps with the second range of pore sizes, and
the third filter comprises a composition of 25% third fibrous layer and 75% third surface layers.

2. The particle filtration system of claim 1, wherein the fibrous layer and the surface layers of the first, second and third filter include edges that are bonded together.

3. The particle filtration system of claim 1, wherein surfaces of the fibrous layer and the surface layers of the first, second and third filter are bonded together.

4. The particle filtration system of claim 1, wherein the fibrous layer of the first, second and third filter comprises a web of entangled fibers that comprise a three-dimensional layer.

5. The particle filtration system of claim 1, wherein the fibrous layer of at least one of the first, second and third filter comprises a depth that is greater than a depth of the pair of surface layers.

6. The particle filtration system of claim 1, wherein at least one of the fibrous layer of the first, second and third filter comprises polyethylene terephthalate.

7. The particle filtration system of claim 1, wherein the surface layers of at least one of the first, second and third filter comprise polypropylene.

8. The particle filtration system of claim 1, wherein the fibrous layer of at least one of the first, second and third filter comprises an entangled fiber structure.

9. The particle filtration system of claim 1, wherein the fibrous layer of at least one of the first, second and third filter comprises a crystalline structure.

10. The particle filtration system of claim 1, wherein the fibrous layer of at least one of the first, second, third and/or an additional fourth filter comprises pseudoboehmite.

11. The particle filtration system of claim 1, wherein the second range of pore sizes of the second filter is smaller than the first range of pores sizes of the first filter by adding additional surface layers to the second filter and the third range of pore sizes of the third filter is smaller than the second range of pores sizes of the second filter by adding additional surface layers to the third filter.

12. The particle filtration system of claim 1, wherein
the five first filters in the first filter segment are in physical contact with each other without being bonded together;
the five second filters in the second filter segment are in physical contact with each other without being bonded together; and
the five third filters in the third filter segment are in physical contact with each other without being bonded together.

13. The particle filtration system of claim 1, wherein the first filter segment, second filter segment and third filter segment are in physical contact with each other without being bonded together.

14. A particle filter system, comprising:
a first filter segment that comprises a plurality of first filters, wherein
each of the first filters includes a first fibrous layer configured to capture particulates bonded between a pair of first outer layers,
the first outer layers comprise a higher density than the first fibrous layer,
the first outer layers each include a first range of pore sizes, and
each of the first filters comprises a composition of between 50-95% first fibrous layer and 5-50% first outer layers;
a second filter segment that includes a plurality of second filters, wherein
each of the second filters includes a second fibrous layer configured to capture particulates bonded between a pair of second outer layers,
the second outer layers comprise a higher density than the second fibrous layer,
the second outer layers each include a second range of pore sizes,
the second range of pore sizes is smaller than but overlaps with the first range of pore sizes, and
each of the second filters comprises a composition of between 40-85% second fibrous layer and 15-60% second outer layers; and
a third filter segment that comprises a plurality of third filters, wherein
each of the third filters includes a third fibrous layer configured to capture particulates bonded between a pair of third outer layers,
the third outer layers comprise a higher density than the third fibrous layer,
the third outer layers each include a third range of pore sizes,
the third range of pore sizes is smaller than but overlaps with the second range of pore sizes, and
the third filter comprises a composition of between 0-75% third fibrous layer and 25-100% third outer layers.

15. The particle filter system of claim 14, wherein the thickness of the first, second and third pairs of outer layers determine pore sizes of the first, second and third range of pores sizes with an increase in thickness resulting in a smaller pore size.

16. A particle filter system, comprising:
a first filter segment that comprises more than one first filter, wherein
each first filter includes a fibrous particle storage medium bonded between a pair of first filter media having a first range of pore sizes, and
only edges of each more than one first filter are fixed together while each first filter is in physical contact with each proximate first filter;
a second filter segment that comprises more than one second filter, wherein
each second filter includes a fibrous particle storage medium bonded between a pair of second filter media having a second range of pore sizes, and
only edges of each more than one second filter are fixed together while each second filter is in physical contact with each proximate second filter; and
a third filter segment that comprises more than one third filter, wherein
each third filter includes a fibrous particle storage medium bonded between a pair of third filter media having a third range of pore sizes, and
only edges of each more than one third filter are fixed together while each third filter is in physical contact with each proximate third filter; and
wherein the second range of pore sizes is smaller than but overlaps with the first range of pore sizes and the third range of pore sizes is smaller than but overlaps with the second range of pore sizes.

17. The particle filter system of claim 16, wherein the first, second and third filter media comprise layers of a melt blown polymer fiber, wherein the first, second and third range of pore sizes decreases as additional of layers of the melt blown polymer fiber are added.

* * * * *